(12) United States Patent
Singh et al.

(10) Patent No.: US 12,079,205 B2
(45) Date of Patent: Sep. 3, 2024

(54) SNAPSHOT ISOLATION QUERY TRANSACTIONS IN DISTRIBUTED SYSTEMS

(71) Applicant: Microsoft Technology Licensing, LLC, Redmond, WA (US)

(72) Inventors: Sarvesh Singh, Issaquah, WA (US); Xianfei Deng, Redmond, WA (US); Hari Krishna Sunder, Redmond, WA (US); Sandeep Lingam, Redmond, WA (US); Srikumar Rangarajan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/328,992

(22) Filed: Jun. 5, 2023

(65) Prior Publication Data

US 2023/0315721 A1    Oct. 5, 2023

Related U.S. Application Data

(63) Continuation of application No. 17/207,282, filed on Mar. 19, 2021, now abandoned.

(51) Int. Cl.
*G06F 16/00* (2019.01)
*G06F 16/215* (2019.01)
*G06F 16/23* (2019.01)
*G06F 16/2455* (2019.01)
*G06F 16/27* (2019.01)

(52) U.S. Cl.
CPC ........ *G06F 16/2379* (2019.01); *G06F 16/215* (2019.01); *G06F 16/2343* (2019.01); *G06F 16/2455* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 7,574,419 B2 * | 8/2009 | Krishnaswamy ... | G06F 16/2379 707/999.005 |
| 11,625,389 B2 * | 4/2023 | Singh ..................... | G06F 16/27 707/703 |
| 2020/0034373 A1 * | 1/2020 | Lee ..................... | G06F 16/2365 |

* cited by examiner

*Primary Examiner* — Debbie M Le
(74) *Attorney, Agent, or Firm* — Weaver IP L.L.C.

(57) ABSTRACT

Methods for snapshot isolation query transactions in distributed systems are performed by systems and devices. Distributed executions of queries are performed in a processing system according to an isolation level protocol for data management and data versioning across one or more data sets, one or more compute pools, etc., within a logical server via a single transaction manager that oversees the isolation semantics and data versioning. Read transactions of queries are performed lock-free via the isolation semantics, and instant rollbacks, point-in-time queries, single-phase commits in the distributed systems are also provided. Abort and clean up operations are performed based on a distributed abort protocol and a determined oldest active transaction for the system in which the single transaction manager does not track read-only transactions, and client nodes do not maintain commit tables for transactions.

20 Claims, 7 Drawing Sheets

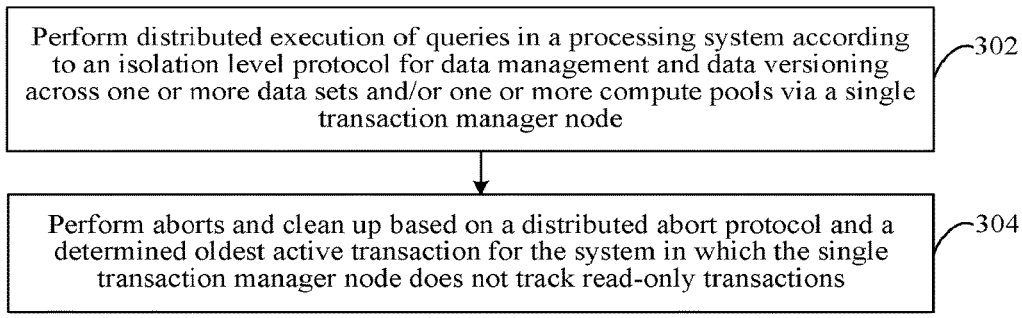
FIG. 3
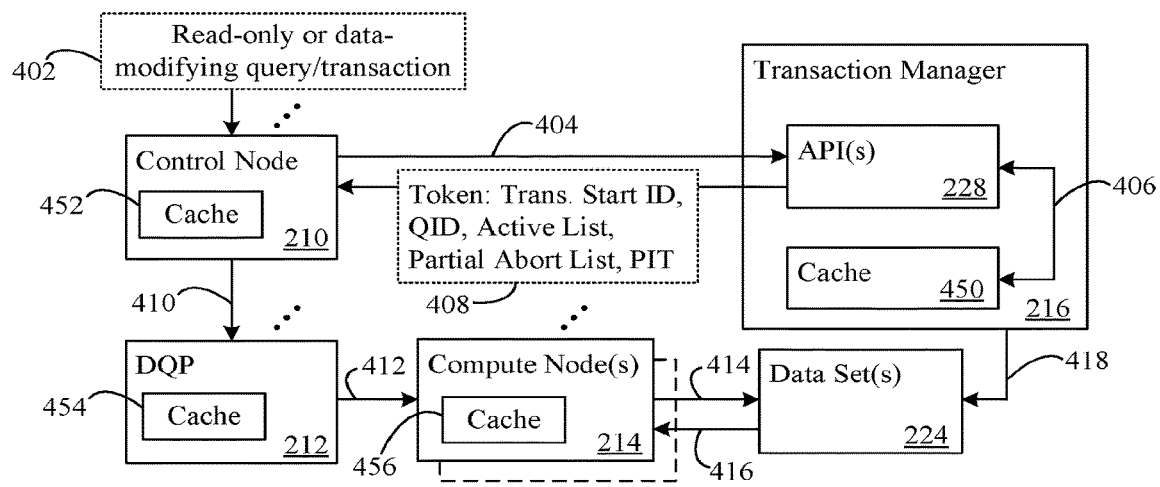
FIG. 4
FIG. 5

SNAPSHOT ISOLATION QUERY TRANSACTIONS IN DISTRIBUTED SYSTEMS

CROSS-REFERENCE TO RELATED APPLICATION(S)

The present application is a continuation of pending U.S. patent application Ser. No. 17/207,282, entitled "SNAPSHOT ISOLATION QUERY TRANSACTIONS IN DISTRIBUTED SYSTEMS," filed on Mar. 19, 2021, which is related to U.S. patent application Ser. No. 17/207,219, entitled "SNAPSHOT ISOLATION QUERY TRANSACTIONS IN DISTRIBUTED SYSTEMS," filed on Mar. 19, 2021, the entireties of which are incorporated by reference herein.

BACKGROUND

Commercial database systems and data warehouses execute queries having extended execution times against large tables of data. Such queries may be received and executed while other queries are currently running, and this concurrency leads to operations on changed data by the executing queries that are not intended or desired. Additional issues, such as maintaining Halloween protection during query operations on data in tables, becomes problematic in these scenarios, as does the management of transactions and data versioning with the scaling of these systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for snapshot isolation query transactions in distributed systems are performed by systems and devices. Distributed executions of queries are performed in a processing system according to an isolation level protocol for data management and data versioning across one or more data sets, one or more compute pools, etc., within a logical server via a single transaction manager that oversees the isolation semantics and data versioning. Read transactions of queries are performed lock-free via the isolation semantics, and instant rollbacks, point-in-time queries, single-phase commits in the distributed systems are also enabled. Abort and clean up operations are performed based on a distributed abort protocol and a determined oldest active transaction for the system in which the single transaction manager does not track read-only transactions, and client nodes are not required maintain commit tables for transactions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart of a computing system for snapshot isolation query transactions in distributed systems, in accordance with an example embodiment.

FIG. 4 shows a flow diagram for snapshot isolation query transactions in distributed systems, in accordance with an example embodiment.

FIG. 5 shows a block diagram of a cache data structure for snapshot isolation query transactions in distributed systems, in accordance with an example embodiment.

Figure 1:
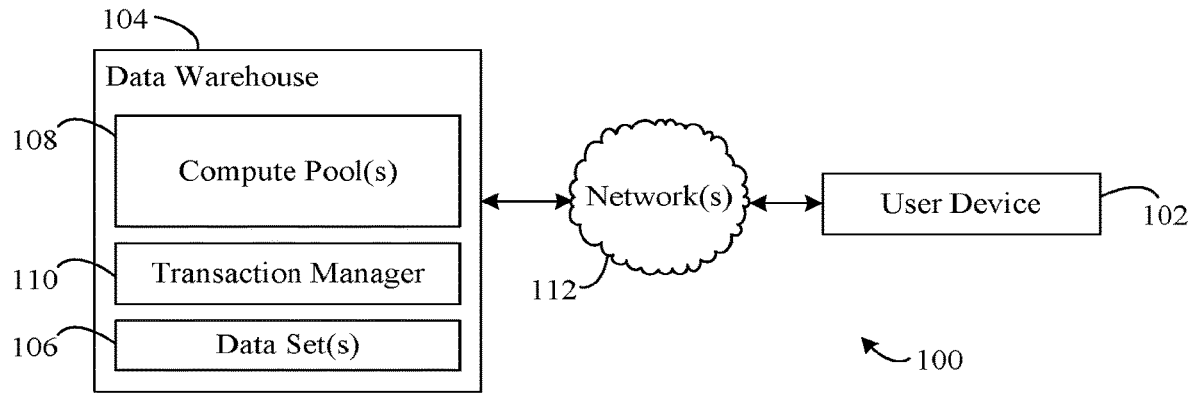
FIG. 1 shows a block diagram of a computing system for snapshot isolation query transactions in distributed systems, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

In the context of the embodiments herein, e.g., for relational databases, a "data set" is stored as a "table" of data, and these terms, "tables" and "data sets" may be used interchangeably in the description.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for snapshot isolation query transactions in distributed systems. Section III below describes example computing devices that may be used to implement features of the embodiments described herein. Section IV below describes additional examples and advantages, and Section V provides some concluding remarks.

II. Example Embodiments for Snapshot Isolation Query Transactions in Distributed Systems Methods for snapshot isolation query transactions in distributed systems are performed by systems and devices. Various embodiments herein are directed to database systems and computing centers, which may be cloud-based, such as but not limited to, data warehouses, systems for "Big Data" analytics, enterprise systems, other database systems that store very large data sets, and/or the like, and while some embodiments are described in the context of data warehouse implementations, embodiments are not so limited. Described embodiments are applicable to any type of database server implementation, such as but not limited to, SQL Server® from Microsoft Corporation of Redmond, WA. Additionally, embodiments are described for snapshot isolation versioning, but other versioning models are also adaptable to the described technics and are contemplated herein, such as but not limited to, RCSI (read committed isolation level) versioning, and/or the like.

In embodiments, a data warehouse system may comprise multiple compute pools within a logical server. A compute pool may include, without limitation, a control node (i.e., a front end node), a distributed query processor (DQP), one or more compute nodes, and/or the like. Control nodes and associated DQPs may act as query endpoints that are responsible for producing a distributed plan for an incoming query and dividing work among a pool of compute nodes, where each compute node may be responsible for distributively processing data from one or more distributions, i.e., portions or distributions of a data set, of a large distributed table. Each control and compute node in the embodiments described may be configured to run/execute its own instance of a database server, each of which may be assigned a resource manager identifier unique to the data warehouse system. In embodiments, an instance of database server may comprise a portion of a node(s), a node, more than one node, etc.

In implementations, compute pools may share the same transaction manager node to start or commit a transaction. Additionally, queries are contemplated to be directed against a single, or multiple, databases (DBs), which may include writing across all databases within a logical server that comprise the same transaction manager node. That is, cross-DB query support is implicit in the described embodiments according to the versioning semantics.

Data maintained in a table of a database is versioned such that multiple queries can be executed on specific data versions without data alterations affecting executing queries, as described in further detail herein. As noted above, embodiments may be described with respect to different isolation levels or versioning, one of which is snapshot isolation. Examples described for snapshot isolation utilize data versions and a lock matrix where read queries do not take any locks for the execution thereof. The described protocol semantics also enable support cross logical server transactions while supporting snapshot isolation consistency, and are extensible to support RCSI versioning. For instance, in snapshot isolation, read and write versions last for an entire transaction and the same values are utilized for each query, while in RCSI, a read version is updated for each query, and a write version is kept the same for an entire transaction. As an example, consider a scenario for snapshot isolation in which a transaction for a table begins, and a read version of '10' and a write version of 'NULL' are assigned. When a select operations is next performed, the read and write versions stay the same, but when a delete operation is subsequently performed, the transaction changes data and is promoted to a write transaction with the write version being provided with a value of '12', for example. In this scenario, subsequent select and insert operations for the table also have read versions of '10' and write versions of '12'. In contrast, an RCSI transaction, while also initially having a read version of '10' and a write version of 'NULL' assigned at the beginning, would have a read version of '11' assigned for the first select operation, and a read and write version of '12' assigned for the delete operation. The subsequent select operation would have a read version of '13' assigned with the write version of '12' maintained, and the insert operation would have a read version of '14' assigned with the write version of '12' maintained.

User transactions, when started on a control node of the system, e.g., a front end node that receives a user query, communicate with a transaction manager node that returns a token associated with each query. The tokens include, without limitation, a transaction start identifier of the query (e.g., a transaction version), a query identifier, an active queries/transactions list, a partial abort list of recently aborted queries, a point-in-time, and/or the like. The token is passed down to compute nodes (e.g., backend nodes doing work on behalf of this transaction) via the compute node and a DQP. In embodiments, any compute node can also start a transaction to move data/files without blocking user queries, as data/files follow version chains according to the isolation protocol. Hence, most of the work done in the system is versioned, so no scan/read query is blocked behind any operation while maintaining support for the implemented isolation versioning. Additionally, it contemplated herein that backend transactions, in addition to or lieu of user transactions, may be performed by systems according the embodiments herein.

Each control/compute node in the system may keep local caches of aborted transaction which are synchronized with each query. A control node passes down the synchronizing information to the compute nodes in its compute pool via tokens, thus the compute nodes do not need to communicate with the transaction manager node for most queries. However, in embodiments, when a recently aborted query list is large, direct communication between compute nodes and the transaction manager node to obtain the list is provided. The transaction manager node is configured to maintain local caches to quickly service requests from the control node and the compute nodes and avoid data flow bottlenecks. In some scenarios, many queries in the system are read-only queries, and the embodiments herein provide for the transaction manager node to not be required to persist specific read-only query information, while maintaining the ability to return read versions with an active queries/transactions list when required.

An online active queries/transactions list is stored in memory on the transaction manager node which reflects the true list for entire system and is always keeps synchronized with on-disk data (e.g., when needed to start write transactions). In embodiments, the system utilizes application programming interfaces (APIs) that are used to acquire locks for data-altering queries to be snapshot isolation consistent at the transaction manager schema layer of the system. This enables the ability to begin/commit and/or abort transactions in compliance with the isolation versioning. In embodiments, read-only transactions do not require commits or aborts, or tracking thereof, by the transaction manager node.

The described embodiments also enable queries across multiple databases within same logical server and/or across compute pools in the same logical server, using the same versioning semantics and methodology. Additionally, logical metadata operations also scan the correct snapshot version of the metadata for a given query, and this same snapshot is shared across multiple queries, e.g., in the absence of any data definitions or data definition language (DDL).

Accordingly, embodiments herein enable a data warehouse system to provide snapshot level consistency for data versions to all user transactions and support cross database and cross-compute pool transactions. Further, systems that utilize the described embodiments reduce operational complexity, reduce intra-system communications, and provide immediate and reliable rollbacks of data. For instance, through versioning semantics, the embodiments herein enable lock-free scans for read-only queries, instant data rollback across the distributed system responsive to aborts, reliable and single-phase commits across the distributed system, point-in-time queries with optimized visibility lists on data and metadata, the ability to forego tracking specific information for read-only queries, and the ability to forego maintaining commit tables on clients/nodes where on-the-fly active/abort lists guarantee snapshot behavior.

Additionally, consistency for data versioning, and data management, is further improved by the distributed determination of the oldest active transaction in the system via a heartbeat protocol and the distributed abort protocol, described herein. For example, embodiments provide for a distributed oldest active transaction protocol to track the oldest active transaction version commit identifier in the system which allows the cleanup of system activity list items (including commit and abort identifiers), files comprising data stored by the system, metadata, binary large objects (blobs), and/or the that are older than the transaction associated with the oldest active transaction identifier. The transaction manager node does not keep track of read-only transactions, in embodiments, and this distributed oldest active transaction protocol reliably determines the oldest active transaction, across all compute pools sharing the same transaction manager, in what may be an unreliable environment where messages can be lost or delayed. The distributed abort protocol described herein enables the release of resources/locks when any control/compute node goes down, is paused, restarts, etc., and locks are held. Distribution of the abort protocol enables the modification of any active state of a transaction to an abort state quickly in the distributed system.

Accordingly, the embodiments herein provide for solutions to issues with data versioning in databases through unique versioning semantics, a distributed determination of the oldest active transaction in the system via a heartbeat protocol, and a distributed abort protocol. These and other embodiments will be described in further detail below in this Section, in association with the Figures, and in Sections/Subsections that follow.

Systems, devices, and apparatuses herein may be configured in various ways for snapshot isolation query transactions in distributed systems, such as data warehouses that maintain large databases. For instance, FIG. 1 will now be described. FIG. 1 shows a block diagram of a system 100 that is configured for snapshot isolation query transactions in distributed systems, according to example embodiments.

As shown in FIG. 1, system 100 includes a user device 102 and a data warehouse 104. In embodiments, user device 102 and data warehouse 104 communicate with each other over a network 112. It should be noted that in various embodiments different numbers of user devices and/or data warehouses, and/or subcomponents thereof, are present. Additionally, according to embodiments, any combination of the systems and/or components illustrated in FIG. 1 are present in system 100.

Network 112 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for interacting with a database, data warehouse, and/or database server, such as providing queries against tables/data sets. User device 102 also includes additional components (not shown for brevity and illustrative clarity) including, but not limited to, components and subcomponents of other devices and/or systems herein, in embodiments. In some embodiments, user device 102 may comprise a computing device/system hosting a service or application that provides queries against tables/data sets.

Data warehouse 104 comprises one or more server computers, computing systems, and/or computing devices, which may include one or more distributed or "cloud-based" servers in embodiments. Data warehouse 104 may comprise one or more on-premises servers in addition to, or in lieu of, cloud-based servers, in different implementations contemplated herein. Various systems/devices herein, such as data warehouse 104, are configured to provide services utilized by user device 102, such as business services and/or applications involving data warehousing, database hosting, and/or like. For instance, data warehouse 104 includes one or more compute pool(s) 108 that may each include, without limitation, a control node, a DQP, one or more compute nodes, and/or the like, as described herein. Data warehouse 104 also includes a transaction manager node 110 associated with compute pool(s) 108, configured to perform functions for snapshot isolation query transactions in distributed systems, as described in further detail herein, and one or more data sets 106 ("data sets 106" hereinafter).

Data sets 106 include databases and/or the like, in embodiments, which may be very large data sets such as for "Big Data" analytics and/or data warehousing. It is contemplated herein that one or more of data sets 106 are to the order of petabytes, or more, in embodiments. Data sets 106 may include any type of data, including relational data, organized as tables having columns for the data.

As noted above, compute pool(s) 108 may include a control node that comprises one or more server computers, server systems, and/or computing devices, such as an on-premises server(s) in addition to, or in lieu of, cloud-based servers. A control node may include an instance of a database server application and is configured to act as the query endpoint for incoming queries, to produce a distributed plan for an incoming query in conjunction with a DQP. In embodiments, a compute node and a DQP may be logically and/or physically separate, or combined in whole/part. The distributed query plan divides work for query processing among compute nodes of compute pool(s) 108. That is, according to embodiments, a control node and a DQP are configured to receive and transform an incoming query into a set of queries that are run against distributions of a data set, e.g., in parallel, via the compute nodes.

Compute nodes may each comprise one or more server computers, server systems, and/or computing devices, such as an on-premises server(s) in addition to, or in lieu of, cloud-based servers. Compute nodes may also each include an instance of a database server application, and are configured to read and/or process data from one or more distributions of large tables in performance of query execution tasks as distributed by the control node/DQP. In embodiments herein, compute nodes 110 are configured to perform functions and/or operations in accordance with snapshot isolation query transactions in distributed systems, including transactions based on versioning, heartbeat communications, distributed abort functions, etc.

Transaction manager node 110 drives the versioning and semantics for snapshot isolation query transactions in distributed systems in the described embodiments. For example, transaction manager node 110 is configured to version, or uniquely identify, incoming queries that alter or modify data (i.e., queries that are not read-only) and data that is altered/modified by such queries. Transaction manager node 110 is also configured to supervise and maintain active, commit, and abort information for such queries. These and additional details regarding transaction manager node 110 are described in further detail below.

As noted above, data warehouse 104 includes one or more distributed or "cloud-based" servers, in embodiments. That is, data warehouse 104 may be a network, or "cloud," implementation for applications and/or services associated with hosting databases and/or data warehousing in a network architecture/cloud platform. A cloud platform includes a networked set of computing resources, including servers, routers, etc., that are configurable, shareable, provide data security, and are accessible over a network such as the Internet, according to embodiments. Cloud applications/services for hosting databases and/or data warehousing are configured to run on these computing resources, often atop operating systems that run on the resources, for entities that access the applications/services, locally and/or over the network. A cloud platform is configured to support multi-tenancy as noted above, where cloud platform-based software services multiple tenants, with each tenant including one or more users who share common access to certain software services and applications of the cloud platform, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

While a data warehouse (e.g., data warehouse 104) is shown in system 100 for non-limiting purposes of description and illustration, in various embodiments, alternate implementations for database hosting are also contemplated herein.

Figure 2:
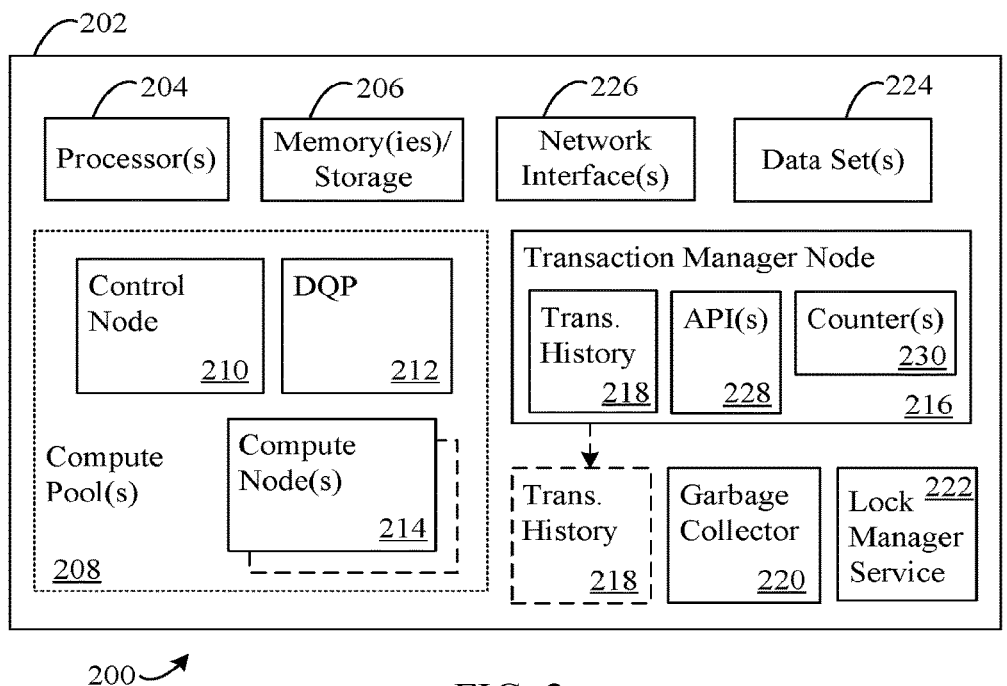
FIG. 2 shows a block diagram of a computing system for snapshot isolation query transactions in distributed systems, according to an example embodiment.

Referring now to FIG. 2, a block diagram of a system 200 is shown for snapshot isolation query transactions in distributed systems, according to an example embodiment. System 200 as exemplarily illustrated and described is configured to be an embodiment of data warehouse 104 of system 100 in FIG. 1. That is, system 200 is illustrated as being configured to perform operations of a data warehouse based on the techniques described herein. System 200 is described as follows.

System 200 includes a computing system 202 which is any type of server or computing system, as mentioned elsewhere herein, or as otherwise known, including without limitation cloud-based systems, on-premises servers, distributed network architectures, a data warehouse or portions thereof, and/or the like. As shown in FIG. 2, computing system 202 includes one or more processors ("processor") 204, one or more of a memory and/or other physical storage device ("memory") 206, as well as one or more network interfaces ("network interface") 226. Computing system 202 also includes a compute pool(s) 208, a transaction manager node 216, a garbage collector 220, and a lock manager service 222. Also illustrated for system 200 is data set(s) 224, which may be an embodiment of data set(s) 106 of FIG. 1.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache(s), temporary database memory, etc., for versioning and/or query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of compute pool(s) 208, transaction manager node 216, garbage collector 220, and/or lock manager service 222, including one or more of the components thereof as described herein, which may be implemented as computer program instructions, or alternative as hardware, as described herein.

Memory 206 includes volatile storage portions such as a random access memory (RAM) and/or persistent storage portions such as hard drives, non-volatile RAM, caches, and/or the like, to store or be configured to store computer program instructions/code for snapshot isolation query transactions in distributed systems as described herein, as well as to store other information and data described in this disclosure including, without limitation, data sets, tables of information associated with queries, indexes, lists or tables of data version information, and/or the like, in different embodiments. For instance, computing system 202 also includes a transaction history 218 and data set(s) 224 which may be stored in memory 206, e.g., as on-disk storage. In embodiments, transaction history 218 and data set(s) 224 may be stored in a storage external to computing system 202, and may be available for sharing/use by computing system 202 and/or other systems (e.g., multiple pools of compute/processing nodes, as described herein, etc.) via a network or storage interface.

Network interface 226 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100 in FIG. 1, including systems that store data sets, user devices, compute nodes, and/or the like, over a network such as network 112.

System 200 also includes additional components (not shown for brevity and illustrative clarity) including, but not limited to, components and subcomponents of other devices and/or systems herein, as well as those described below with respect to FIG. 9, according to embodiments.

Compute pool(s) 208 may be an embodiment of compute pool(s) 108 in FIG. 1, as described above. In the illustrated embodiment, compute pool(s) 208 includes a control node 210, a distributed query processor (DQP) 212, and one or more compute node(s) 214, although embodiments contemplate different numbers of one or more of these components in various implementations. Likewise, one or more of compute pool(s) 208 may be present computing system 202.

Control node 210 may comprise any database server application, in addition to processors and memory described above, and operate as a front end, or a query endpoint, in embodiments, that receives queries from user devices, services, applications, and/or the like. Control node 210 may include a data definition language (DDL) engine and a query optimizer, in embodiments. A DDL engine is configured to execute statements to create, modify, and delete tables, indexes, and relationships in a data set, e.g., based on an incoming query. In embodiments, a DDL engine is configured to execute statements to create, modify, and/or delete tables, lists, arrays, and/or other data structures that are generated in performance of the query transactions. A query optimizer is configured to generate query plans for execution of incoming queries against data sets based at least on the incoming queries and other information, e.g., cardinality estimates, etc. To being query execution, control node 210 may communicate with transaction manager node 216 and provide information associated with a query (e.g., an API call responsive to receiving the query) such that transaction manager node 216 is enabled to assign a transaction start identifier (i.e., a begin sequence number) for the query and to generate a token as further described herein. Control node 210 is configured to perform operations for distributed aborts and heartbeat communications, as further described herein, according to embodiments.

DQP 212 may include subcomponents such as a deserializer, a Directed Acyclic Graph (DAG) generator, a workload manager, and/or the like in embodiments, and may be configured to orchestrate a query task DAG across large numbers, e.g., thousands, of compute nodes at petabyte-scale reliably. A deserializer is configured to deserialize requests for distributed query processing on data set distributions, received from control node 210, and to provide its output to the DAG generator which in turn is configured to generate a DAG, such as a static DAG that outlines process dependencies and operations for performing distributed execution of query tasks/transactions. DAGs are provided from the DAG generator to the workload manager which is configured to assign ones of compute node(s) 214 to perform the distributed query tasks/transactions in accordance with the embodiments herein for snapshot isolation query transactions in distributed systems.

Control node 210 may be a logically or physically separate entity from other components of computing system 202, and DQP 212 may be a logically or physically separate entity from other components of computing system 202. For example, in some embodiments, control node 210 and DQP 212 may be implemented in different physical or logical server hosts that are communicably linked for performance of snapshot isolation query transactions in distributed systems. In such embodiments, DQP 212 may comprise a separate server node while control node 210 comprises its own server.

Compute node(s) 214 may comprise any database server application, in addition to processors and memory described above, and operate as a back end, in embodiments, that receives portions of distributed query tasks/transactions from control node 210 and/or DQP 212. One or more compute node(s) 214 may be present in given embodiments, and each of compute node(s) 214 may include a data definition language (DDL) engine and a query optimizer, in embodiments, as described above. Compute node(s) 214 is configured to operate on specific versions of data, in accordance with snapshot isolation query transactions in distributed systems, and are configured to perform operations for distributed aborts and heartbeat communications, as further described herein.

While not shown in FIG. 2 for illustrative clarity, control node 210 and each of compute node(s) 214 may include a local cache, described in further detail below. Each local cache may include a list of aborted query transactions utilized to determine appropriate versions of data that are allowed to be visible to active queries/transactions.

Transaction manager node 216 may be an embodiment of transaction manager node 110 in FIG. 1, described above. Transaction manager node 216 is configured to drive the versioning and semantics for snapshot isolation query transactions in distributed systems in the described embodiments, including but not limited to, providing versions, or unique identifiers to incoming queries that alter or modify data (i.e., queries that are not read-only, or data manipulation language (DML) operations) and data that is altered/modified by such queries, as well as supervising and maintaining active, commit, and abort information for such queries. Transaction manager node 216 is also configured to assign and to use versions for remote blobs, delta store rows, and DDL operations (i.e., for logical metadata), and/or the like. As illustrated, transaction manager node 216 includes one or more API(s) 228 ("APIs 228" hereinafter), one of which may be a BeginTransaction API to which a call may be made by control node 210, for a received query, in order to acquire a token comprising a unique transaction start identifier of the query, a unique query identifier, an active queries/transactions list, and a partial abort list, as described herein. In embodiments, the transaction start identifier (ID) acts as a query begin sequence number, for queries that are not read-only, that temporally associates the received query with prior queries (i.e., sequentially with respect to time). The query ID (QID) for a query that modifies or alters data may be the same as its transaction start ID. It should be noted that read-only queries may be assigned a "NULL" transaction start ID as these queries are not tracked by transaction manager node 216, in embodiments, but read-only queries are assigned a QID. In embodiments, a QID for a read-only query/transaction may be associated with the system active queries/transactions list, as described in further detail below. The transaction start IDs and QIDs (in addition to commit and abort IDs described herein) for queries in the system are assigned by transaction manager node 216 based on a global versioning variable counter 230 ("global counter 230") that increments to maintain uniqueness for different queries/ transactions according to snapshot isolation (or RCSI, in alternate embodiments). Global counter 230 may any type of incrementing counter, such as an integer counter, an unsigned integer counter, and/or the like, that may be of any length. Queries are thus enabled to filter out rows based on the version semantics described herein. The novel format of versioning described herein allows an architecture based on embodiments to share versioning across databases, compute pools, data warehouses, etc., to support multiple Read/Write databases.

Transaction manager node 216 enables transaction visibility to be implicit via the versioning semantics to be used for reads performed in query transactions to verify the correct data versions are read. To further enable support a common version store, transaction manager node 216 is configured to write versioning information to transaction logs, in transaction history 218, which may include commit or abort history information, and which may be on-disk information in embodiments. Additionally, APIs 218 may support transactions in the overall system and may be implemented to access the information maintained by transaction manager node 216 in a cache thereof and/or in transaction history 218. For example, APIs 228 may also include APIs to commit transactions, abort transactions, get a transaction state, get a list of queries with a specified type, and/or the like. That is, transaction manager node 216 is configured and enabled to be contacted by control nodes and compute nodes in a data warehouse to allow access to real-time, or near real-time, changes to transaction status and data happening in the system. Accordingly, there is little if any delay in the distributed systems herein for supporting version semantics of snapshot isolation query transactions.

It is also contemplated herein that one or more of control node 210, DQP 212, and/or compute node(s) 214 may include an API(s) similar or equivalent to APIs 228 in order to access/receive information of transaction manager node 216, as well as to perform operations such as commits, aborts, and/or the like. That is, calls to APIs 228 described herein are not limiting and embodiments include alternate calls from other APIs of components in system 200 that perform the same, or substantially the same, operations.

While not shown in FIG. 2 for illustrative clarity, transaction manager node 216 may include one or more local caches, which may be globally-unique and/or accessible, in the system, as described in further detail below.

Garbage collector 220 is configured to determine and/or mark versions of data and information associated with a database for which a cleanup is appropriate according to the versioning semantics for snapshot isolation query transactions in distributed systems described herein. In embodiments, garbage collector 220 provides indicia of the determined and/or marked versions of data and information to transaction manager node 216 for on-disk persistence of a cleanup.

Lock manager service 222 is configured to lock and unlock data and resources associated with queries that modify/alter data. Lock manager service 222 communicates with transaction manager node 216 for the performance of distributed aborts, as described herein.

FIG. 3 shows a flowchart 300 for snapshot isolation query transactions in distributed systems, in accordance with an example embodiment. Further structural and operational examples will be apparent to persons skilled in the relevant art(s) based on the following descriptions. Flowchart 300 is described as follows with respect to system 200 of FIG. 2.

Flowchart 300 begins at step 302. In step 302, distributed execution of queries in a processing system is performed according to an isolation level protocol for data management and data versioning across one or more data sets and/or one or more compute pools via a single transaction manager node. For instance, as described above, computing system 202 of system 200 in FIG. 2 is configured to perform distributed execution, over one or more compute pools, of queries against a database, or databases, based on snapshot isolation for query transactions in which a single transaction manager node data management and data versioning. Further details regarding such performance are provided below.

In step 304, aborts and cleanup are performed based on a distributed abort protocol and a determined oldest active transaction for the system in which the single transaction manager does not track read-only transactions. For example, as described above, computing system 202 of system 200 in FIG. 2 is enabled and configured to utilize a distributed abort protocol to perform aborts according to versioning semantics for snapshot isolation in query transactions, and to maintain the identity of the oldest active transaction for the system to facilitate appropriate cleanup operations of data and information by garbage collector 220. Additional details regarding such aborts and cleanup operations are provided below.

Figures 6, 7:
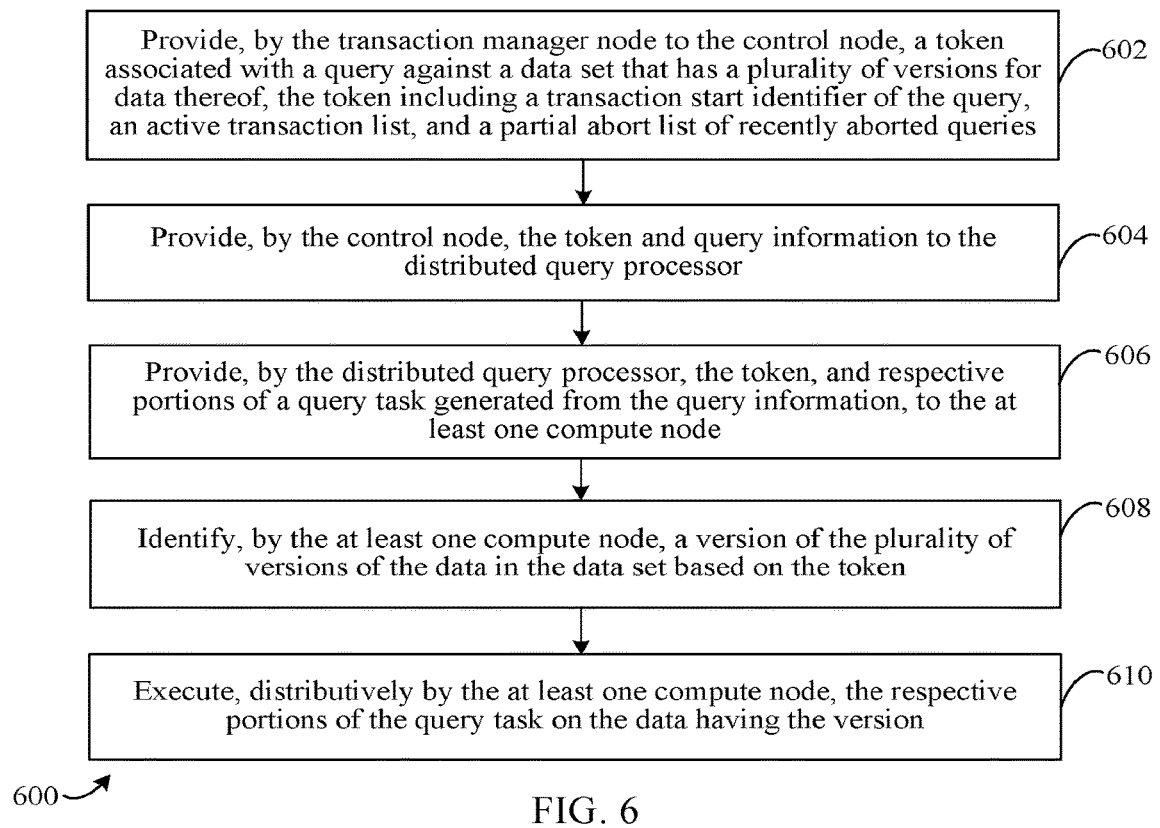
FIG. 6 shows a flowchart for snapshot isolation query transactions in distributed systems, in accordance with an example embodiment.
FIG. 7 shows a data structure for snapshot isolation query transactions in distributed systems, in accordance with an example embodiment.

FIG. 4, FIG. 5, and FIG. 6, each of which are for snapshot isolation query transactions in distributed systems, will now be described with reference to each other. FIG. 4 shows a flow diagram 400 for snapshot isolation query transactions in distributed systems, according to an example embodiment, with respect to system 200 of FIG. 2. FIG. 5 shows a block diagram of a cache data structure 500 for snapshot isolation query transactions in distributed systems, according to an example embodiment. FIG. 6 shows a flowchart 600 for snapshot isolation query transactions in distributed systems, according to an example embodiment. Further structural and operational examples will be apparent to persons skilled in the relevant art(s) based on the following descriptions. Flowchart 600 is described below, also with respect to system 200 of FIG. 2.

Turning now to FIG. 4, flow diagram 400 begins where a query 402 against one or more databases is received by control node 210, e.g., from user device 102 in FIG. 1, acting as a front end for the distributed query system. The query may be a read-only, or may be a query that modifies or alters data in the database(s). In embodiments, multiple compute pools comprising groups that include ones of control node 210, DQP 212, and compute node(s) 214 may be utilized during execution of query 402, as noted herein and as illustrated in FIG. 4 via the ' . . . ' for these components. Control node 210, responsive to receiving the query, is configured to issue an API call 404 to one of APIs 228 of transaction manager node 216. In embodiments, API call 404 is a BeginTransaction call for which a token is requested. To generate the token, API call 404 is handled by transaction manager node 216, including an access 406 to a cache 450 of transaction manager node 216, which may be a master cache for the system.

Referring also to FIG. 5, cache data structure 500 is shown as including a transaction manager cache 502 (e.g., comprising a cache 450 of transaction manager node 216 as illustrated in FIG. 4) that may include a commit table 504, and an abort index 506 and a point-in-time (PIT) index 508 associated therewith. Commit table 504 exemplarily shows a row of this table, and each received query that modifies/ alters data may have its own row. That is, each query received by control node 210, that is not a read-only query, may have a row in commit table 504. Each row may include, but is not limited to, a transaction start ID, a transaction end ID (which may for a Commit or an Abort), a query transaction of the corresponding query (e.g., begin, commit, abort, etc.), an oldest active ID for the oldest transaction in the system, a PIT value for point-in-time queries, a resource manager ID specifying a compute pool or database server instance that will run the query, and/or the like. Abort index 506 exemplarily shows a row of this index, and each query that is recently aborted may have a row in this index until the row is provided to a compute pool via a token as a partial abort list. Rows of abort index 506 include, but are not limited to, a unique transaction abort ID and the transaction start ID of the aborted query. PIT index 508 exemplarily shows a row of this index, and each query that is directed to data of a prior point-in-time may have a row in this index to track such queries. Rows of PIT index 508 include, but are not limited to, a PIT value and the transaction start ID of the corresponding query.

One or more instances of an abort cache 510 of cache data structure 500 may be included in transaction manager node 216 (e.g., comprising cache 450, and as a master cache for the system), in control node 210 (e.g., comprising a cache 452), in DQP 212 (e.g., comprising a cache 454), and/or in each of compute node(s) 214 (e.g., comprising a cache 456). Abort cache 510 maintains a sequential list, as rows, of each aborted query in the system, where each row may include, without limitation, a transaction abort ID and the transaction start ID of the corresponding query. It should be noted that abort index 506 may only store recently aborted queries to facilitate quick responses therefor, e.g., for tokens or other API calls, in view of the versioning semantics and snapshot isolation query transactions in distributed systems, while abort cache 510 maintains a complete, system-wide abort list.

One or more instances of an active cache 512 of cache data structure 500 may be included in transaction manager node 216 (e.g., comprising cache 450, and as a master cache for the system). Active cache 512 maintains a sequential list, as rows, of each active transaction/query in the system, where each row may include the same or similar entries as for commit table 504 described above, such as but without limitation, the transaction start ID, the transaction end ID (which may for a Commit or an Abort), the query transaction of the corresponding query (e.g., begin, commit, abort, etc.), the oldest active ID for the oldest transaction in the system, the PIT value for point-in-time queries, the resource manager ID specifying a compute pool or database server instance that will run the query, and/or the like, but for transactions that modify or alter data, and that are currently active in the system. It should be noted that active index 506 is configured to store currently active queries/transactions to facilitate quick responses therefor, e.g., for tokens or other API calls, in view of the versioning semantics and snapshot isolation query transactions in distributed systems, thus maintaining a complete, system-wide active transaction list.

In fulfillment of API call 404, access 406 may include populating a new row of commit table 504 for the query 402 with relevant information when the query is to modify or alter data, as described above. As noted above, read-only queries may be assigned a "NULL" transaction start ID as these queries are not tracked by transaction manager node 216, but are assigned a QID for adherence to versioning semantics and data visibility, in embodiments. Thus, access 406 to cache 450 returns a transaction start ID, QID, an active transaction list based on queries having an "active" transaction state, and a partial abort list of recently aborted queries as listed in abort index 506 to generate a token 408 that is provided as the return of API call 404. In embodiments, for a PIT query, the assigned PIT value as populated in PIT index 508 may also be returned. Additionally, as noted above, a QID for a read-only query/transaction may be associated with the system active queries/transactions list that corresponds to the PIT value, in embodiments, as described in further detail below.

Referring also now to FIG. 6 and flowchart 600, this flowchart begins in step 602. In step 602, a token associated with a query against a data set that has a plurality of versions for data thereof is provided by the transaction manager node to the control node, the token including a transaction start identifier of the query, a QID, an active transaction list, and a partial abort list of recently aborted queries. For instance, as similarly described above with respect to FIGS. 4 and 5, transaction manager node 216 is configured to provide such a token, e.g., token 408, to control node 210 responsive to query 402 being received. In embodiments, an API call for beginning a transaction may be utilized to cause transaction manager node 216 to generate the token. The token may be based on cached system information, as described above, and a valid sequential transaction start ID for queries that are not read-only, along with a corresponding QID, according to embodiments. Read-only query tokens having a "NULL" transaction start ID in their tokens are nonetheless enabled to adhere to version visibility based on their token QID.

In step 604 of flowchart 600, the token and query information are provided by the control node to the distributed query processor. For example, as shown in FIG. 4, control node 210 may provide token 408 and query information of query 402, at 410, to DQP 212. The query information may comprise portions of query 402, optimized/processed portions thereof, and/or the like. Control node 210 may also be configured to perform user level transactions associate with query 402, and to update cache 452 with the partial abort list provided in token 408 (thus providing control node 210 with an up-to-date abort list for the system).

In step 606 of flowchart 600, the token, and respective portions of a query task generated from the query information, are provided by the distributed query processor to the at least one compute node. For instance, DQP 212 is configured to generated distributed tasks 412 for query 402, each of which may be respectively provided to ones of compute node(s) 214 for processing with token 408, for each of the distributed tasks so that each of compute node(s) 214 is enabled to determine and operate on the correct, visible version of data in the queried database(s) to which query 402 is directed against. Additionally, DQP 212 is configured to update cache 454 with the partial abort list provided in token 408 (thus providing DQP 212 with an up-to-date abort list for the system).

In step 608 of flowchart 600, a version of the plurality of versions of the data is identified, by the at least one compute node, in the data set based on the token. For example, as shown in FIG. 4, compute node(s) 214 is configured to determine, based on information in token 408, appropriate visibility for versions of the data. Compute node(s) 214 is configured to update cache 456 with the partial abort list provided in token 408 (thus providing compute node(s) 214 with an up-to-date abort list for the system), and identifies the oldest transaction in the system and the transaction start ID and/or QID for query 402 at its beginning. This information is utilized by compute node(s) 214, based on an access 414 to data version tables, to determine the proper, visible version(s) 416 of the data in the database, in embodiments for each row of data, via a comparison of listed data versions and associated information, e.g., other query begin transaction IDs, commit IDs, abort IDs, states, and/or the like, stored in the data version tables associated with the database. In addition, PIT queries and associated tokens enable compute node(s) 214 to determine proper versions of data that correspond to the specified PIT. Further details regarding such data version tables are provided below with respect to FIG. 7.

In step 610 of flowchart 600, the respective portions of the query task are executed distributively, by the at least one compute node, on the data having the version. For instance, ones of compute node(s) 214 are configured to execute the portions of the query task provided by DQP 212 utilizing the proper, visible version(s) 416 of the data.

When queries complete, a completion call to an API may be made to finalize completion with an operation 418 to update version information for data in a table(s) described below in FIG. 7. In some scenarios, queries or tasks thereof may not complete successfully at control node 210, DQP 212, and/or ones of compute node(s) 214. In these cases, an abort call, e.g., via APIs 228, may be initiated, and appropriate abort caches, described above, may be updated to reflect the abort, e.g., via updating the transaction end ID. When a query completes successfully, and in the case of a query that modifies or alters data will be committed, a commit call, e.g., via APIs 228, may be initiated, where operation 418 comprises a single-phase commit, and commit table 504 of transaction manager cache 502 in FIG. 5, as described above, may be updated to reflect the commit, e.g., via updating the transaction end ID. It should be noted that adherence to the versioning semantics here for snapshot isolation query transactions in distributed systems enable a single-phase commit to be performed in the described distributed systems.

Referring now to FIG. 7, a data structure 700 for snapshot isolation query transactions in distributed systems, according to an example embodiment. Data structure 700 may be stored in any storage described herein, e.g., with reference to data set(s) 224 in FIGS. 2 and 4. Data structure 700 includes a data row version table 702 and a scan query table 704, exemplarily illustrated for a row having data in a table of a database, and reflects the following system activity described by way of example.

As shown in data row version table 702, the row is written initially, having a version R1, by a query having a transaction start ID or start version of 3, and a transaction end ID, as commit ID or sequence number or version, of 6, and a later query having a transaction start ID of 8 alters or deletes data in the row for version R1. Thus, a drop version ID of 8 is associated with the row version R1 The query having the transaction start ID of 8, and a transaction end ID, as commit ID or sequence number or version, 10, later writes data to the row. However, because there is a prior version of data (R1) for this row, the write of the query with transaction start ID 8 is denoted as a data version R1_1 (and the drop version of 8 is populated in the table for R1). A still later query having a transaction start ID of 12 alters or deletes data in the row for version R1_1, and also writes data to the row based on transaction end ID, as commit ID or sequence number or version, 14. However, again because there are prior versions of data (R1, R1_1) for this row, the write of the query with transaction start ID 12 is denoted as a data version R1_2, and the R1_1 version of the data is denoted with drop version 12. A still later query having a transaction start ID of 16 alters or deletes data in the row for version R1_2, and also writes data to the row based on transaction end ID, as commit ID or sequence number or version, 18. However, again because there are prior versions of data (R1, R1_1, R1_2) for this row, the write of the query with transaction start ID 16 is denoted as a data version R1_3, and the R1_2 version of the data is denoted with drop version 16. The drop version for data R1_3 is "NULL" until a subsequent transaction alters/deletes the data.

As shown in scan query table 704, a read query Q1 having a QID of 7 can view data having a transaction end ID of 6 or earlier based on the start time of Q1, thus data version R1 of data for the row is visible to query Q1. A read query Q2 having a QID of 11 can view data having a transaction end ID of 10 or earlier based on the start time of Q2, thus data version R1_1 of data for the row is visible to query Q2. A read query Q3 having a QID of 13 can view data having a transaction end ID of 10 or earlier based on the start time of Q3, thus data version R1_1 of data for the row is also visible to query Q3. It should be noted that the query with transaction start ID 12 is in the active list with respect to Q3, and thus data version R1_2 is not visible to query Q3. A read query Q4 having a QID of 17 can view data having a transaction end ID of 14 or earlier based on the start time of Q4, thus data version R1_2 of data for the row is visible to query Q4, but it should be noted that the query with transaction start ID 16 is in the active list with respect to Q4, and thus data version R1_3 is not visible. Finally, a read query Q5 having a QID of 20 can view data having a transaction end ID of 18 or earlier based on the start time of Q5, thus data version R1_3 of data in the row is visible to query Q5.

In other words, when the data version for a row is not associated with a query in an abort list, is not associated with a query in an active list (e.g., is committed), and the data version or commit ID for the row is less than transaction start ID or the QID, that data version of the row is visible to the query. Additionally, it is contemplated herein that a query is able to read its own written data, i.e., where the transaction start ID of the query is associated with the row data version in data row version table 702.

With reference to aborted queries and data row version table 702, it should be evident to persons of skill in the relevant art(s) having the benefit of this disclosure and the descriptions herein for snapshot isolation query transactions in distributed systems that instant rollback to prior data versions for rows of data are enabled. That is, as each data row includes its respective, corresponding write transaction start ID, and if a query is aborted, its aborted state is reflected in data row version table 702 as corresponding to the transaction start ID for the aborted query, and the abort list is reflected in scan query table 704. Accordingly, aborted data versions for rows are excluded from visibility allowing a query to operate on a most recent prior version of the data that is visible based at least on the transaction start ID of a valid row of data that is visible. In a similar manner, PIT queries, having PIT values in their associated tokens, are enabled to identify appropriately visible versions of data that correspond to the specified PIT and an activity list of active queries/transactions that correspond to the PIT.

As noted above, embodiments herein provide additional techniques for consistency in data versioning and data transactions.

For example, a distributed determination of the oldest active transaction in the system, a heartbeat protocol, and a distributed abort protocol are utilized for data versioning and management, e.g., in data warehouse systems. The distributed oldest active transaction protocol tracks the oldest active transaction version commit identifier in the system which allows the cleanup of system activity list items (including commit and abort identifiers), files comprising data stored by the system, metadata, binary large objects (blobs), and/or the that are older than the transaction associated with the oldest active transaction identifier. Because embodiments herein allow for transaction manager nodes to forego tracking of read-only query details, the distributed oldest active transaction protocol reliably determines the oldest active transaction, across all compute pools sharing the same transaction manager node, in what may be an unreliable environment where messages can be lost or delayed. The distributed abort protocol enables the release of resources/locks when any control/compute node goes down, is paused, restarts, etc., and locks are held. Distribution of the abort protocol enables the modification of any active state of a transaction to an abort state quickly in the distributed system.

Each control and/or compute node (or each resource manager, as implemented) may store one or more states associated therewith. For example, a current global read version from the transaction manager node and a prior global read version from the transaction manager node may be stored, along with a resource manager ID, and a service epoch (e.g., a monotonically increasing counter assigned at the start of a process for a resource manager). Each control/compute node or resource manager may provide a heartbeat message to the transaction manager node. Such heartbeat messages may include values, such as but not limited to, the prior global read version/counter for a read-only query stored at the control/compute node, and an oldest read-only query identifier. These heartbeat communications may also include a system activity list comprising active identifiers of data-modifying transactions that are active (which may be collected by iterating over all transactions on a given control/compute node), the resource manager ID to identify message coming from specific control/compute nodes, and the service epoch of a control/compute node.

As part of the heartbeat protocol, a transaction manager node is configured to provide a heartbeat response to the heartbeat message. For example, a transaction manager node may provide back a value of a new, current oldest global read version in the heartbeat response. When this value/version from the transaction manager node global counter is received, each control/compute node (or resource manager) updates its respective prior read-only query identifier or counter with its older value of the already-stored oldest query identifier, and then the stored oldest query identifier is modified with the received new oldest global read version in the heartbeat response. The heartbeat response for each control/compute node may also include a list of data-modifying transaction IDs, for respective nodes, which are active according to the transaction manager node (e.g., not aborted already). Any transaction ID not in the list, for a given control/compute node has its associated transaction task aborted locally by the respective control/compute node.

In embodiments, for the duration of heartbeat message and corresponding response, transaction start messages to the transaction manager node from a given control/compute node are blocked to maintain the sanctity of the protocol and the versioning semantics described herein. When a control/compute node process starts up or restarts, that node sends a "forget" message to the transaction manager node, enabling the transaction manager node to abort all transactions associated with this starting/restarting node or corresponding resource manager. The "forget" message may contain the resource manager ID, a service epoch of the node corresponding to the process start/restart (i.e., a higher value than a prior service epoch). Other messages may also be blocked until the node in question receives a successful response for the "forget" message to maintain correctness of the protocol and the versioning semantics described herein. Additionally, when starting/restarting nodes or corresponding resource managers initialize, a transaction manager is configured to provide a list of aborted transactions, as described herein, to initialized nodes/resources managers.

The transaction manager node may also store the state(s) as a list for each participant control/compute node (or resource manager), which may include, without limitation, the resource manager ID (e.g., added when the node starts/restarts a transaction), the service epoch of the node or resource manager (e.g., updated when heartbeat is received with this value or when a transaction starts), the prior read-only query counter (e.g., as updated when a heartbeat message is received with this value, where the initial value="NULL"), an oldest read-only query identifier (e.g., as updated when heartbeat is received with this value, where the initial value="NULL"), and a last updated time (e.g., as updated when a heartbeat is received and this is used to detect if any node is not responsive).

The transaction manager node may also be configured to determine and maintain a global oldest active transaction ID, which may be periodically, or regularly, updated. For instance, a transaction manager node may run a background task to compute oldest active transaction, globally, in the system. As an example, the oldest active transaction, also known as the minimum watermark or min watermark, may be determined as the minimum value between (a) the global counter from which each transaction ID is assigned, and (b) the minimum over the oldest read-only query identifiers of all control/compute nodes of the system, which are provided via heartbeat messages and stored by the transaction manager node. To determine the minimum over the oldest read-only query identifiers of all control/compute nodes of the system, i.e., (b) above, the transaction manager node is configured to iterate over all states of nodes/resource managers listed at the transaction manager node. In determinations via such iterations, the transaction manager node may exit the iterations and the minimum determination when a state listing has a prior read-only query counter state of "NULL," according to embodiments. That is, in cases where prior read-only query counter state is "NULL" for any participant control/compute node in a pool, the determination/identification of the oldest active transaction may be delayed or later restarted until a next heartbeat from a control/compute node registers a value for its prior read-only query counter state that is not "NULL." Thus, the overall system oldest active transaction is computed and updated at the transaction manager node when each of control/compute nodes have sent a value of their respective prior read-only query counter state. In this way, the transaction manager node will not miss any versions acted on by any of the control/compute nodes. Once the oldest active transaction is identified, any control/compute node in the system may retrieve indicia thereof from the transaction manager node and the oldest active transaction identified may be used to determine which data, files, etc., in the system are eligible for cleanup operations.

In embodiments, when a compute pool is paused, the information of all nodes associated therewith (e.g., resource manager IDs) is provided to the transaction manager node to enable aborts for any related, ongoing transactions and the release of associated locks. The transaction manager node may run another background task to iterate through all control/compute nodes or resource managers to detect if anode has not sent its heartbeat message using the last updated time noted above for each node. Transactions started by a later unresponsive node are aborted and a release of locks is performed after a timeout value/threshold is reached. A transaction manager node is also configured to abort transaction not found in the system activity list that includes the active identifiers of data-modifying transactions that are active, as noted above (e.g., from a heartbeat message). This abort information is passed on to other nodes as well via heartbeat responses to abort tasks which are not part of the current compute pool topology (e.g., processes not known to a DQP).

Figure 8:
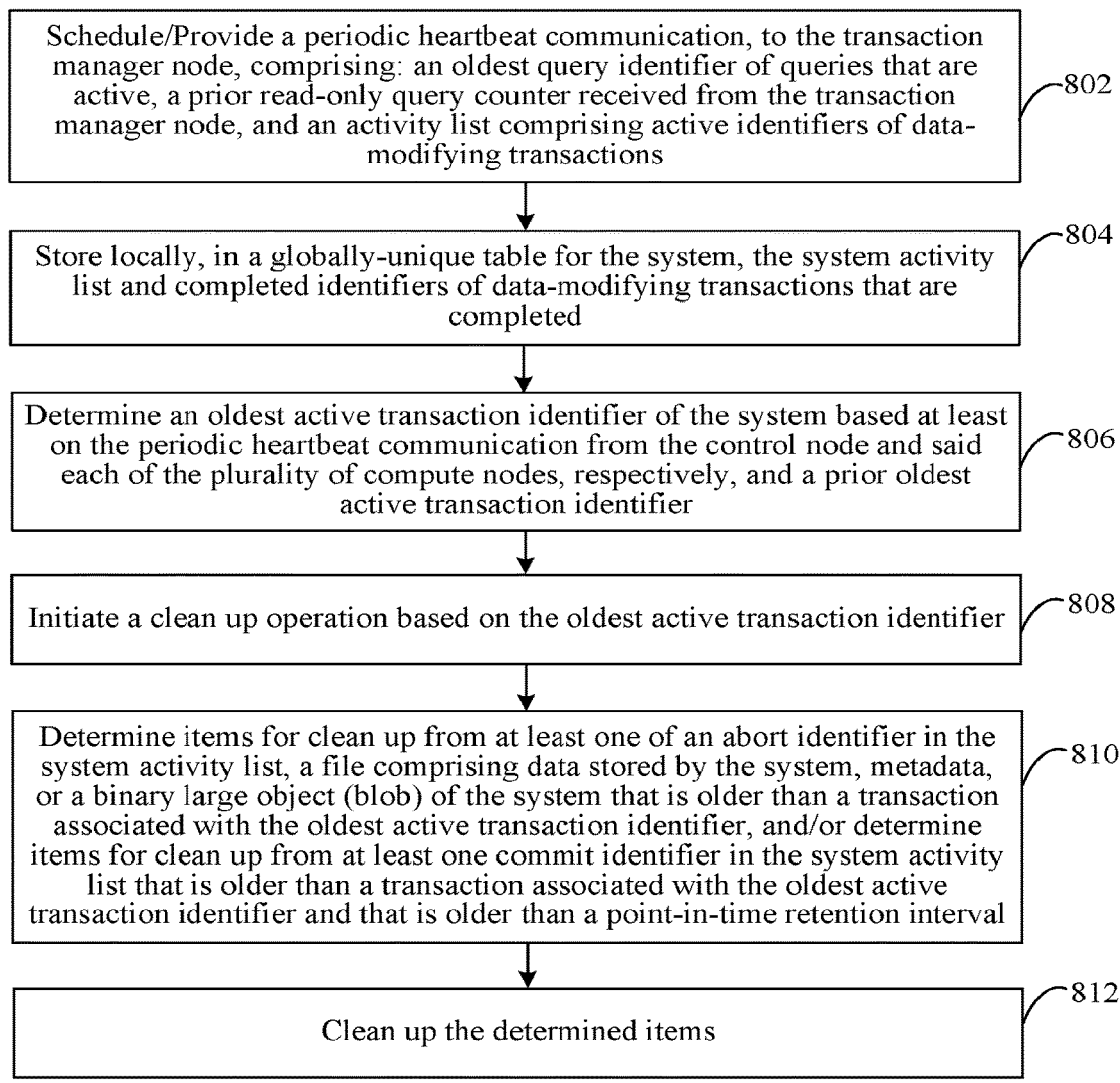
FIG. 8 shows a flowchart for snapshot isolation query transactions in distributed systems, in accordance with an example embodiment.
Figure 9:
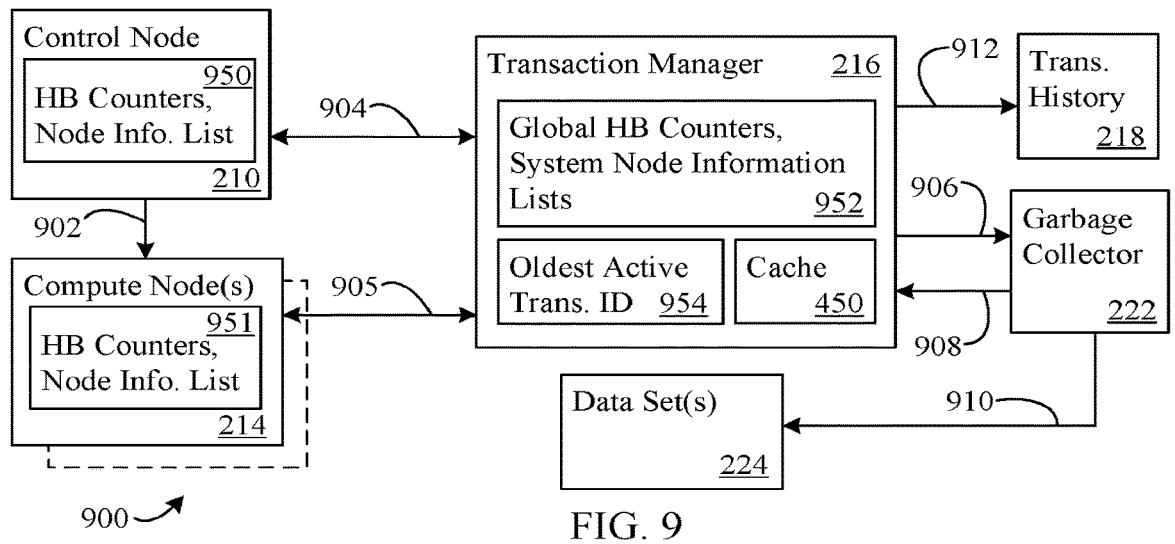
FIG. 9 shows a flow diagram for snapshot isolation query transactions in distributed systems, in accordance with an example embodiment.

FIG. 8 and FIG. 9 will now be described with reference to each other and in view of the oldest active transaction identification, the heartbeat protocol, and the distributed abort protocol, as noted above.

FIG. 8 shows a flowchart 800 for snapshot isolation query transactions in distributed systems, according to an example embodiment. Further structural and operational examples will be apparent to persons skilled in the relevant art(s) based on the following descriptions. Flowchart 800 is described below, also with respect to system 200 of FIG. 2 and flow diagram 400 of FIG. 4. FIG. 9 shows a flow diagram 900 for snapshot isolation query transactions in distributed systems, according to an example embodiment, with respect to system 200 of FIG. 2 and flow diagram 400 of FIG. 4.

Turning now to FIG. 8, flowchart 800 begins at step 802. In step 802, a periodic heartbeat communication to the transaction manager node comprising an oldest local query identifier, a prior read-only query counter of queries executed by the plurality of compute nodes, and an activity list comprising active identifiers of data-modifying transactions, is scheduled and/or provided by the control node and each of the plurality of compute nodes. For example, a compute node and a control node as described herein are configured to schedule and/or provide heartbeat communications to a transaction manager node.

Referring also to FIG. 9 and flow diagram 900, control node 210, e.g., as described above in FIGS. 2 and 4, is configured to provide a token and query information/distributed tasks, such as via a DQP, to compute node(s) 214 via an operation 902 where compute node(s) 214 perform corresponding operations based on visible data versions according to snapshot isolation query transactions in distributed systems. Control node 210 is also configured to schedule/provide, and/or exchange, a periodic heartbeat communication 904 to/with transactions manager node 216, and compute node(s) 214 are likewise configured to schedule/provide, and/or exchange, periodic heartbeat communications 905 to/with transactions manager node 216. In embodiments, periodic heartbeat communication 904 and period heartbeat communications 905 include an oldest query identifier and a prior read-only query counter of queries executed by each control node in the system and by each of the plurality of compute nodes in the system, respectively, over each compute pool implemented. The oldest query identifiers may initially be provided to control node 210 and compute node(s) 214 and from transaction manager node 216 as part of a heartbeat protocol for which heartbeat communications are communicated, e.g., in a heartbeat communication response that may also include a local system activity list that comprises active identifiers of data-modifying transactions that are active and locally-maintained by transaction manager node 216, as described herein. The associated oldest query identifier and the prior read-only query counter may be stored in heartbeat counters and node information list 950 by control node 210 on receipt from transaction manager node 216. Similarly, associated oldest query identifiers and the prior read-only query counters may be stored in heartbeat counters and node information list 951 by compute node(s) 214 on receipt from transaction manager node 216.

Similarly, as noted above, in the exchange of subsequent periodic heartbeat communications 904, and subsequent heartbeat communications 905, heartbeat counters may be updated with different values as transactions/queries in the system are processed and executed. As an example, a new oldest query identifier for control node 210, e.g., stored in global heartbeat counters and system node information lists 952, may be provided by transaction manager node 216 in a subsequent periodic heartbeat communication 904 to control node 210, and new oldest query identifiers for compute nodes 214, respectively, e.g., stored in a global heartbeat counters and system node information lists 952, may be provided by transaction manager node 216 in a subsequent periodic heartbeat communications 905 to corresponding ones of compute nodes 214. If the new oldest query identifier is newer than the stored oldest query identifier in heartbeat counters for a given control/compute node, the prior read-only query counter is updated to the oldest query identifier, and the oldest query identifier is updated to the new oldest query identifier received from transaction manager node 216.

When control node 210 and/or one(s) of compute node(s) 214 (or resource managers) is/are first started (or restarted), their local counter storage of their prior read-only query counters and the oldest query identifiers may be set to "NULL," in embodiments, and transaction manager node 216 stores such values accordingly from the initial heartbeat communication(s). Transaction manager node 214 responds to the heartbeat communication(s) with respective oldest query identifiers from its global counter (e.g., of global counter 230 in FIG. 2), thus enabling a respective node to store a "non-NULL" value for its oldest query identifier, and on a next pair of heartbeat communication/response, to update its oldest query identifier and populate is prior read-only query counter.

In step 804 for flowchart 800 in FIG. 8, the system activity list and completed identifiers of data-modifying transactions that are completed are stored locally in a globally-unique table for the system by the transaction manager node. For example, transaction manager node 216 shown in FIG. 9 includes cache 450, described above with respect to FIG. 4, which may include rows for queries in commit table 504 described with respect to FIG. 5 that denote the transaction state for each query, e.g., begin or active denoting active transactions. In some embodiments, active transactions may be listed separately in an index, not shown for brevity and illustrative clarity.

Referring again to FIG. 8, in step 806 of flowchart 800, an oldest active transaction identifier of the system is determined based at least on the periodic heartbeat communication and a prior oldest active transaction identifier. For example, transaction manager node 216, with reference to FIG. 9, is configured to determine an oldest active transaction identifier 954 in the system, and thus, its associated query. Transaction manager node 216 may be configured to determine the oldest active transaction identifier in the system based on a 'min' function over the oldest read-only query identifiers from control/compute nodes in the system and comparing that determination against a locally stored, prior oldest active transaction identifier for read-only and data modifying queries, as described herein.

In step 808 of flowchart 800 in FIG. 8, a cleanup operation is initiated based on the oldest active transaction identifier. For example, transaction manager 216 is configured to initialize a cleanup operation, and generates an initialization message 906, as illustrated in FIG. 9, with the oldest active transaction identifier.

In step 810 of flowchart 800 in FIGURE, the oldest active transaction identifier is received by a garbage collector from the transaction manager node, and the garbage collector determines first items for clean up from at least one of an abort identifier in the system activity list, a file comprising data stored by the system, metadata, or a binary large object (blob) of the system that is older than a transaction associated with the oldest active transaction identifier and/or determines second items for clean up from at least one commit identifier in the system activity list that is older than a transaction associated with the oldest active transaction identifier and that is older than a point-in-time retention interval. For instance, transaction manager node 216 utilizes garbage collector 220 for cleanup operations, as illustrated in FIG. 9, by providing the system-level oldest active transaction identifier with the initialization message 906. Initialization message 906 causes garbage collector 220 to identify/determine data and information in the system that is eligible for cleanup, i.e., data and information that is older than the oldest active transaction identifier in the system for aborted tasks and data and information that is older than the oldest active transaction identifier in the system and that is older than a point-in-time retention interval for committed tasks. In this way, garbage collection is not performed on committed data that may be retained for PIT transactions/queries until the retention interval elapses. The data and information to be cleaned up may include, without limitation, data in tables, system activity list items, data/information in caches and/or indexes described herein, metadata, remote blobs, and/or the like. Additionally, a tuple mover service, not shown for illustrative clarity and brevity, may be configured to similarly perform its respective operations on versions for allocation/consolidation.

In step 812 of flowchart 800 in FIGURE, the cleanup operation is performed by the garbage collector. For example, garbage collector 220 in FIG. 9 is configured to delete and/or archive data, metadata, files, blobs, etc., as cleanup 910 that are identified in step 810 of flowchart 800. Additionally, versions 908 of the cleaned up data and information noted above are passed back, by garbage collector 220, to transaction manager node 216 which may then truncate lists/entries in cache 950. Further, transaction manager node 216 may be configured to update 912 transaction history 218 based on the cleanup operation and versions 908.

In embodiments, periodic heartbeat communication 904 and/or periodic heartbeat communications 905 also includes a node-based list of active identifiers of data-modifying transactions. Transaction manager node 216 may be configured to abort a query identified by an active identifier in the system activity list that lacks a corresponding identifier in the node-based list. Likewise, embodiments enable a control node and/or a compute node(s) to abort queries based on locally-maintained system activity lists that include active queries for the control node and/or the compute node(s), where the locally-maintained system activity lists are provided from transaction manager node 216 to control node 210 in responses of periodic heartbeat communication 904 and/or to compute node(s) 214 in responses of periodic heartbeat communications 905.

Turning now to additional exemplary embodiments for snapshot isolation query transactions in distributed systems and the distributed abort protocol noted herein, FIG. 10, FIG. 11, and FIG. 12 will be described.

Figure 10:
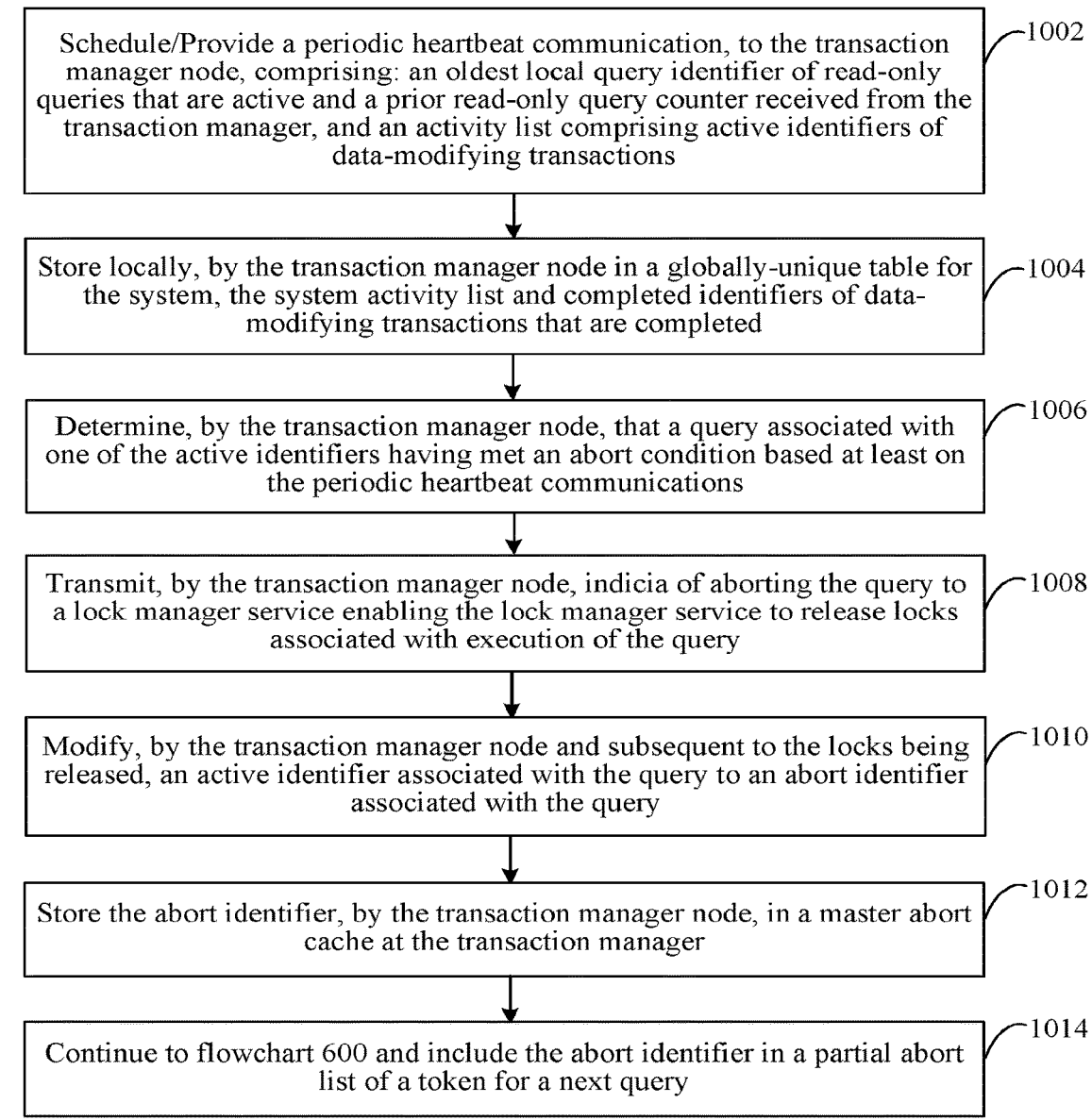
FIG. 10 shows a flowchart for snapshot isolation query transactions in distributed systems, in accordance with an example embodiment.

FIG. 10 shows a flowchart 1000 for snapshot isolation query transactions in distributed systems, according to an example embodiment. Further structural and operational examples will be apparent to persons skilled in the relevant art(s) based on the following descriptions. Flowchart 1000 is described below, also with respect to system 200 of FIG. 2, flowchart 800 of FIG. 8, and flow diagram 900 of FIG. 9.

Flowchart 1000 begins at step 1002. In step 1002, a periodic heartbeat communication comprising an oldest query identifier and a prior read-only query counter of queries executed by the plurality of compute nodes is scheduled and/or provided to the transaction manager node. For example, a compute node and/or a control node as described herein is/are configured to schedule and/or provide heartbeat communications to a transaction manager node as similarly described above with respect to flow diagram 900 of FIG. 9, according to embodiments.

In step 1004, a system activity list comprising active identifiers of data-modifying transactions that are active and completed identifiers of data-modifying transactions that are completed is stored locally by the transaction manager node in a globally-unique table for the system. For example, transaction manager node 216 shown in FIG. 9 includes cache 450, described above with respect to FIG. 4, which may include rows for queries in commit table 504 described with respect to FIG. 5 that denote the transaction state for each query, e.g., begin or active denoting active transactions. In some embodiments, active transactions may be listed separately in an index.

In step 1006, it is determined by the transaction manager node that a query associated with one of the active identifiers has met an abort condition based at least on the periodic heartbeat communications. For instance, transaction manager node 216 is configured to determine when one or more abort conditions are met for queries. As non-limiting examples, abort conditions may include when a transaction manager node or a lock manager service has been unavailable; an abort message being lost while a transaction of the query was completed; an instance of a database server under which the query executes, a process of the control node, or a process of one of the plurality of compute nodes being restarted; a compute pool comprising the control node and the plurality of compute nodes being paused; a begin-transaction message being successfully provided by the transaction manager node and unsuccessfully received by the control node; a transaction start identifier of a query indicating an earlier time than a prior read-only query counter of the control node; a mismatch between a node-based list of active identifiers of data-modifying transactions and the system activity list; an oldest active transaction identifier being more recent than the query associated with an abort identifier; and/or the like.

In step 1008, indicia of aborting the query is transmitted by the transaction manager node to a lock manager service enabling the lock manager service to release locks associated with execution of the query. For example, transaction manager node 216 is configured to provide an indication to lock manager service 222 of system 200 in FIG. 2 that a query will be aborted. This enables lock manager service 222 to unlock any data, files, resources, etc., that were previously locked to perform the query.

In step 1010, an active identifier associated with the query is modified, by the transaction manager node and subsequent to the locks being released, to an abort identifier associated with the query. For instance, after any locks have been released by lock manager service 222, transaction manager node 216 is configured to modify the state of the transaction that is being aborted from 'active', or 'begin', to 'aborted'. This modification may take place in a row of cache 450 in FIG. 4, e.g., in commit table 504 of transaction manager cache 502 shown in FIG. 5.

In step 1012, the abort identifier is stored, by the transaction manager node, in a master abort cache at the transaction manager. For example, transaction manager node 216 is configured to store the abort identifier, along with its transaction start ID, in abort cache 510 shown in FIG. 5. The abort identifier, along with its transaction start ID, may also be stored by transaction manager node 216 in abort index 506 for inclusion with a next token in its partial abort list.

In step 1014, optionally in embodiments, flowchart 1000 may continue to flowchart 600 and include the abort identifier in a partial abort list of a token for a next query.

Figure 11:
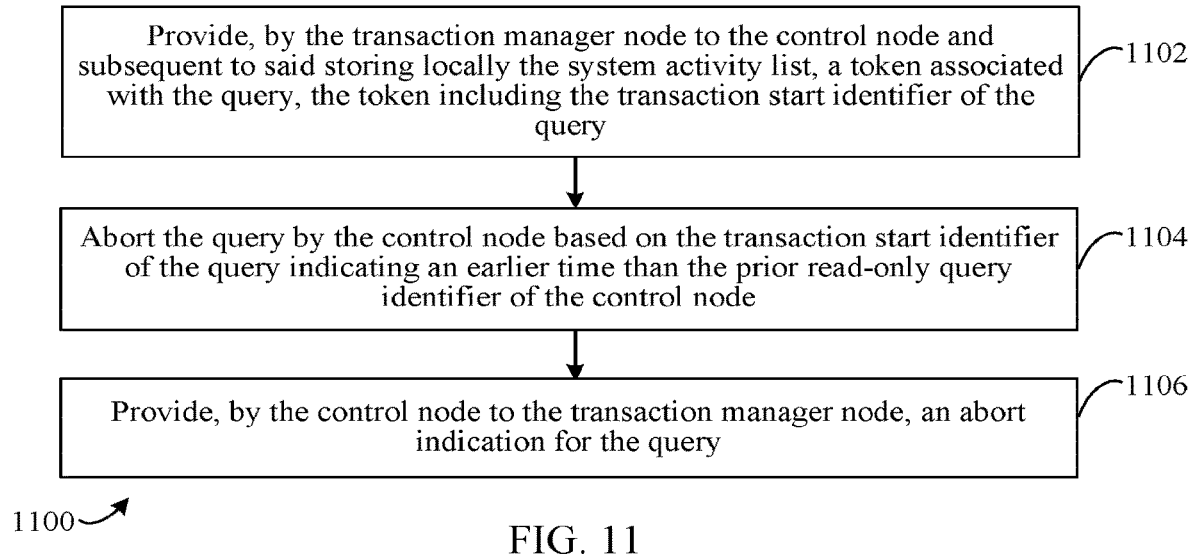
FIG. 11 shows a flowchart for snapshot isolation query transactions in distributed systems, in accordance with an example embodiment.

FIG. 11 shows a flowchart 1100 for snapshot isolation query transactions in distributed systems, according to an example embodiment. Flowchart 1100 is an embodiment of flowchart 1000 of FIG. 10. Further structural and operational examples will be apparent to persons skilled in the relevant art(s) based on the following descriptions. Flowchart 1100 is described below, also with respect to system 200 of FIG. 2 and flowchart 600 of FIG. 6.

Flowchart 1100 begins at step 1102. In step 1102, which may follow step 1004 of flowchart 1000, a token associated with the query is provided, by the transaction manager node to the control node and subsequent to said storing locally the system activity list, the token including the transaction start identifier of the query. For instance, as noted herein, a token that includes a transaction start identifier of a received query is provided by transaction manager node 216 to control node 210 of system 200 in FIG. 2, and as similarly described in step 602 of flowchart 600 in FIG. 6.

As noted above, a transaction start identifier of the query indicating an earlier time than the prior read-only query counter of the control node may be an example abort condition that transaction manager node 216 is configured to detect.

In step 1104, the query is aborted by the control node based on the transaction start identifier of the query indicating an earlier time than the prior read-only query counter of the control node. For example, control node 210 may determine that its stored prior read-only query counter is later than the transaction start identifier in the token provided by transaction manager node 216 in step 1102.

In step 1106, an abort indication for the query is provided by the control node to the transaction manager node. For instance, the abort of the query may be made by issuing an abort call to one of APIs 218 of transaction manager node 216 as illustrated in system 200 as described herein.

From step 1106, operations may continue with step 1006 of flowchart 1000 in FIG. 10 where transaction manager node 216 receives the abort call.

Figure 12:
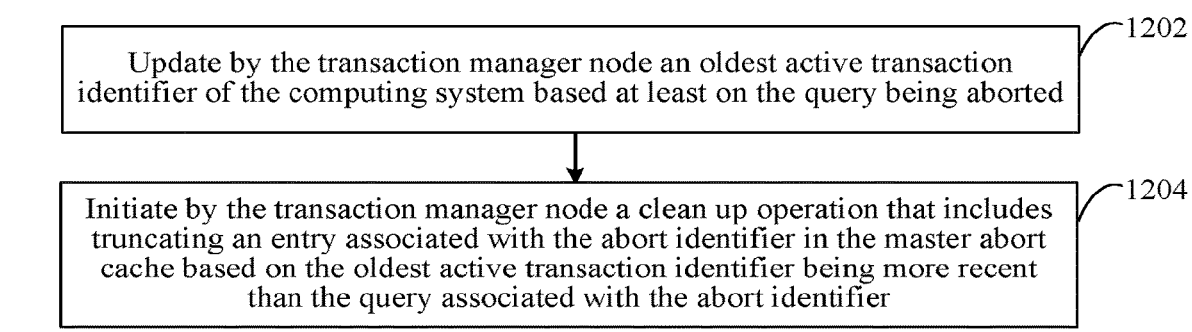
FIG. 12 shows a flowchart for snapshot isolation query transactions in distributed systems, in accordance with an example embodiment.

FIG. 12 shows a flowchart 1200 for snapshot isolation query transactions in distributed systems, according to an example embodiment. Flowchart 1200 is an embodiment of flowchart 1000 of FIG. 10. Further structural and operational examples will be apparent to persons skilled in the relevant art(s) based on the following descriptions. Flowchart 1200 is described below, also with respect to system 200 of FIG. 2, flowchart 800 of FIG. 8, and flow diagram 900 of FIG. 9.

Flowchart 1200 begins at step 1202. In step 1202, which may follow step 1012 of flowchart 1000, an oldest active transaction identifier of the computing system is updated by the transaction manager node based at least on the query being aborted. For instance, as described in flowchart 800, transaction manager node 216 is configured to store a system-level oldest active transaction identifier in global heartbeat counters(s) 952 illustrated in FIG. 9. In some cases, a query that is aborted may correspond to this oldest active transaction identifier. Accordingly, transaction manager node 216 is configured to update the system-level oldest active transaction identifier in global heartbeat counters(s) 952 to have an identifier of the next oldest active transaction.

In step 1204, a cleanup operation that includes truncating an entry associated with the abort identifier in the master abort cache based on the oldest active transaction identifier being more recent than the query associated with the abort identifier is initiated by the transaction manager node. For example, as described above for cleanup operations, out of data entries in caches of transaction manager node 216, e.g., cache 450 in FIG. 4 and/or abort cache 510 in FIG. 5, may be truncated during cleanup when identified by garbage collector 220.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any data structures, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 13:
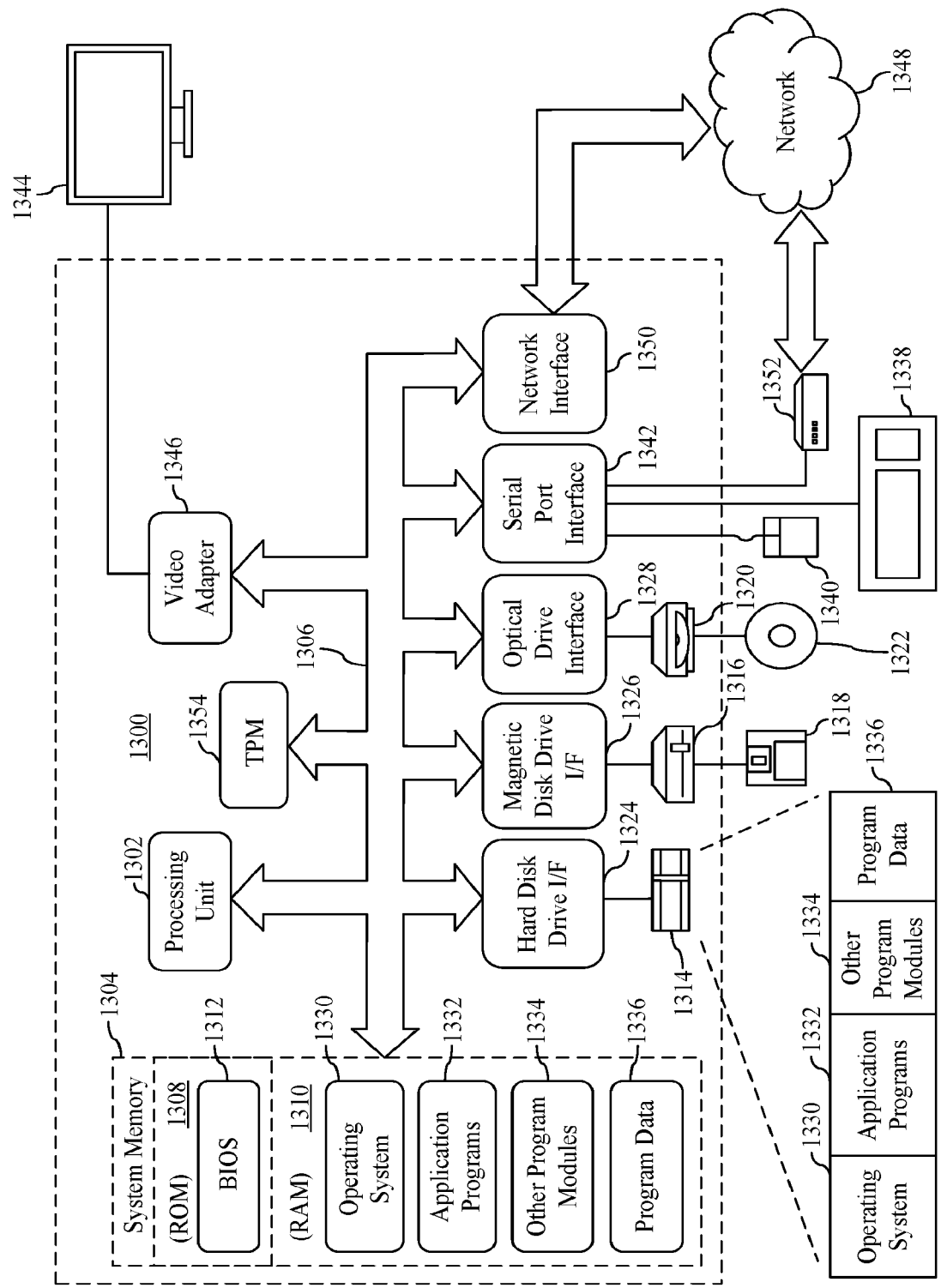
FIG. 13 shows a block diagram of an example computing device that may be used to implement embodiments.

FIG. 13 depicts an exemplary implementation of a computing device 1300 in which embodiments may be implemented. For example, embodiments described herein may be implemented in one or more computing devices or systems similar to computing device 1300, or multiple instances of computing device 1300, in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, servers, and/or clusters, etc., as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing embodiments described herein, such as but not limited to, system 100 in FIG. 1 and system 200 in FIG. 2, along with any components and/or subcomponents thereof, as well any data structures, and operations of the flowcharts/flow diagrams described herein, including portions thereof, and/or further examples described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

TPM 1354 may be connected to bus 1306, and may be an embodiment of any TPM, as would be understood by one of skill in the relevant art(s) having the benefit of this disclosure. For example, TPM 1354 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memory 1320 of FIG. 13). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for snapshot isolation query transactions in distributed systems. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein enable single-phase commits of data in distributed processing systems, enable scalability for distributed processing systems, and provide distributed abort protocols and enable more efficient operation of a single transaction manager in data warehouses and the like, while maintaining robust versioning of data through unique semantics. That is, the embodiments herein utilize a unique combination of versioning semantics, a heartbeat protocol, and distributed tracking of read-only queries that were previously not available for software-based services, query hosts, or data warehouses, much less for the specific embodiments described herein.

The additional examples and embodiments described in this Section may be applicable to examples disclosed in any other Section or subsection of this disclosure.

Embodiments in this description provide for systems, devices, and methods for snapshot isolation query transactions in distributed systems. For instance, a system is described herein. The system is enabled and configured for snapshot isolation query transactions in distributed systems, according to embodiments. The system includes a transaction manager node, a control node, a distributed query processor, and at least one compute node. The transaction manager node is configured to provide to the control node a token associated with a query against a data set that has a plurality of versions for data thereof, the token including a transaction start identifier of the query, an active transaction list, and a partial abort list of recently aborted queries. The control node is configured to provide the token and query information to the distributed query processor, and the distributed query processor is configured to provide the token, and respective portions of a query task generated from the query information, to the at least one compute node. The at least one compute node is configured to identify a version of the plurality of versions of the data in the data set based on the token; and perform, distributively, the respective portions of the query task on the data having the version.

In an embodiment of the system, the query is a read-only query and the at least one compute node is enabled to perform a lock-free scan of the version of the data as a part of the query task. In another embodiment, the query includes one or more data-altering tasks and the transaction manager node is configured to store the transaction start identifier of the query locally in a globally-unique table for the system and in a corresponding row of the data set.

In an embodiment of the system, the transaction manager node is also configured to store, in the globally-unique table, for the query that includes the one or more tasks that modify the data, one or more of: a transaction end identifier; a transaction state; or a point-in-time identifier.

In an embodiment of the system, the transaction end identifier comprises a transaction commit identifier based on the query being successfully completed; and data altered by execution of the query is persisted via a single-phase commit process.

In an embodiment of the system, the transaction end identifier comprises a transaction abort identifier based on the query being unsuccessfully completed; and the transaction manager node, to enable an instant data rollback for the data set, is also configured to: store, in a row of an abort index associated with the globally-unique table, the transaction abort identifier and the transaction start identifier, and provide, to the control node for a next query, a next token having a next partial abort list of recently aborted queries that comprises the transaction abort identifier and the transaction start identifier.

In an embodiment of the system, the query is a point-in-time query that specifies a time in the past; the transaction manager node is configured to provide the token including the transaction start identifier, and where the active transaction list corresponds to the time; and the at least one compute node is configured to identify the version of the plurality of versions of the data in the data set that corresponds to the time based on the token.

In an embodiment of the system, the query also specifies another data set having another plurality of versions for other data thereof, and the token is also associated with the query against the other data; and the at least one compute node being configured to: identify another version of the other plurality of versions of the other data in the other data set based on the token, and perform, distributively, the respective portions of the query task on the other data having the other version.

In an embodiment of the system, the at least one compute node comprises a first compute pool; and the system further comprises a second compute pool that includes at least one other compute node, and that is logically separate from the first compute pool. In the embodiment, the distributed query processor configured to: provide the token, and other respective portions of the query task generated from the query information, to the at least one other compute node in the second compute pool; and the at least one compute node configured to: identify the version of the plurality of versions of the data in the data set based on the token, and perform, distributively, the other respective portions of the query task on the data having the version.

A method performed by a computing system that comprises a transaction manager node, a control node, a distributed query processor, and at least one compute node is also described herein. The method is for snapshot isolation query transactions in distributed systems, according to embodiments. The method includes providing, by the transaction manager node to the control node, a token associated with a query against a data set that has a plurality of versions for data thereof, the token including a transaction start identifier of the query, an active transaction list, and a partial abort list of recently aborted queries; providing, by the control node, the token and query information to the distributed query processor; and providing, by the distributed query processor, the token, and respective portions of a query task generated from the query information, to the at least one compute node. The method also includes performing by the at least one compute node: identifying a version of the plurality of versions of the data in the data set based on the token; and executing, distributively, the respective portions of the query task on the data having the version.

In an embodiment of the method, the query is a read-only query and the method further comprises performing a lock-free scan of the version of the data by the at least one compute node as a part of the query task. In another embodiment, the query includes one or more data-altering tasks and the method further comprises storing the transaction start identifier of the query locally by the transaction manager node in a globally-unique table for the system and in a corresponding row of the data set.

In an embodiment, the method further comprises storing, by the transaction manager and in the globally-unique table, for the query that includes the one or more tasks that modify the data, one or more of: a transaction end identifier; a transaction state; or a point-in-time identifier.

In an embodiment, the transaction end identifier comprises a transaction commit identifier based on the query being successfully completed, and the method further comprising: storing and persisting data altered by execution of the query via a single-phase commit process.

In an embodiment, the transaction end identifier comprises a transaction abort identifier based on the query being unsuccessfully completed, and the method, to enable an instant data rollback for the data set, comprises performing by the transaction manager node: storing, in a row of an abort index associated with the globally-unique table, the transaction abort identifier and the transaction start identifier, and providing, to the control node for a next query, a next token having a next partial abort list of recently aborted queries that comprises the transaction abort identifier and the transaction start identifier.

In an embodiment, the query is a point-in-time query that specifies a time in the past, the method further comprises: providing, by the transaction manager node, the token including the transaction start identifier, and wherein the active transaction list that corresponds to the time; and identifying, by the at least one compute node, the version of the plurality of versions of the data in the data set that corresponds to the time based on the token.

In an embodiment, the query also specifies another data set having another plurality of versions for other data thereof, the token is also associated with the query against the other data, and the method further comprises: identifying, by the at least one compute node, another version of the other plurality of versions of the other data in the other data set based on the token; and performing, distributively by the at least one compute node, the respective portions of the query task on the other data having the other version.

In an embodiment, the at least one compute node comprises a first compute pool; the computing system further comprises a second compute pool that includes at least one other compute node, and that is logically separate from the first compute pool; and the method further comprises: providing by the distributed query processor the token, and other respective portions of the query task generated from the query information, to the at least one other compute node in the second compute pool; identifying, by the at least one compute node, the version of the plurality of versions of the data in the data set based on the token; and performing distributively by the at least one compute node, the other respective portions of the query task on the data having the version.

A computer-readable storage medium is also provided herein. The computer-readable storage medium has program instructions recorded thereon that, when executed by a processing system, perform a method. The method is for snapshot isolation query transactions in distributed systems, according to embodiments. The method includes: providing, by a transaction manager node to a control node, a token associated with a query against a data set that has a plurality of versions for data thereof, the token including a transaction start identifier of the query, an active transaction list, and a partial abort list of recently aborted queries; providing, by the control node, the token and query information to a distributed query processor; providing, by the distributed query processor, the token, and respective portions of a query task generated from the query information, to at least one compute node; and performing by the at least one compute node: identifying a version of the plurality of versions of the data in the data set based on the token, and executing, distributively, the respective portions of the query task on the data having the version.

In an embodiment of the computer-readable storage medium, the query is a read-only query and the method further comprises performing a lock-free scan of the version of the data by the at least one compute node as a part of the query task. In another embodiment, the query includes one or more data-altering tasks and the method further comprises storing the transaction start identifier of the query locally by the transaction manager node in a globally-unique table for the system and in a corresponding row of the data set.

In an embodiment of the computer-readable storage medium, the method further comprises storing, by the transaction manager and in the globally-unique table, for the query that includes the one or more tasks that modify the data, one or more of: a transaction end identifier; a transaction state; or a point-in-time identifier.

In an embodiment of the computer-readable storage medium, the transaction end identifier comprises a transaction abort identifier based on the query being unsuccessfully completed; and the method, to enable an instant data rollback for the data set, comprises performing by the transaction manager node: storing, in a row of an abort index associated with the globally-unique table, the transaction abort identifier and the transaction start identifier; and providing, to the control node for a next query, a next token having a next partial abort list of recently aborted queries that comprises the transaction abort identifier and the transaction start identifier.

Another system is described herein. The system is enabled and configured for snapshot isolation query transactions in distributed systems, according to embodiments. The system includes a transaction manager node, a control node, and a plurality of compute nodes. The control node and each of the plurality of compute nodes being configured to: provide a periodic heartbeat communication, to the transaction manager node, comprising: an oldest read-only query identifier of read-only queries that are active and a prior read-only query counter received from the transaction manager node, and a system activity list comprising active identifiers of data-modifying transactions. The transaction manager node configured to: store locally, in a globally-unique table for the system, the system activity list and completed identifiers of data-modifying transactions that are completed; determine an oldest active transaction identifier of the system based at least on the periodic heartbeat communication from the control node and said each of the plurality of compute nodes, respectively, and a prior oldest active transaction identifier; and initiate a clean up operation based on the oldest active transaction identifier.

In an embodiment of the system, the completed identifiers include at least one of commit identifiers of successfully completed queries or abort identifiers of unsuccessfully completed queries, and the system further comprises a garbage collector configured to: receive the oldest active transaction identifier from the transaction manager node; and perform the clean up operation.

In an embodiment of the system, the garbage collector, to perform the clean up, is configured to: determine first items for clean up from at least one of an abort identifier in the system activity list, a file comprising data stored by the system, metadata, or a binary large object (blob) of the system that is older than a transaction associated with the oldest active transaction identifier; determine second items for clean up from at least one commit identifier in the system activity list that is older than a transaction associated with the oldest active transaction identifier and that is older than a point-in-time retention interval; and clean up the determined first items and the determined second items.

In an embodiment of the system, the transaction manager node, to determine an oldest active transaction identifier, is configured to determine one of the prior read-only query counters from the control node and the plurality of compute nodes that is older than each other one in the system; and the transaction manager node is configured to store the oldest active transaction identifier locally.

In an embodiment of the system, the transaction manager node is configured to: update the oldest active transaction identifier that is stored based on a subsequently-received periodic heartbeat communication.

In an embodiment of the system, the transaction manager node is configured to abort a query identified in the system activity list by an active identifier that lacks a corresponding identifier in the node-based list; or abort a query associated with at least one of the control node or one of the plurality of compute nodes based on a forget message provided therefrom at a startup or a restart thereof.

In an embodiment of the system, the oldest query identifier and the prior read-only query counter each comprise respective local counters maintained respectively by the control node and each of the plurality of compute nodes; or the transaction manager node is configured to provide, to each of the control node and the plurality of compute nodes, a respective periodic heartbeat communication response that includes an oldest query identifier and a local system activity list that comprises locally-maintained active identifiers of data-modifying transactions that are active.

Another method performed by a computing system that comprises a transaction manager node, a control node, and a plurality of compute nodes is also described herein. The method is for snapshot isolation query transactions in distributed systems, according to embodiments. The method includes scheduling, respectively by the compute node and each of the plurality of compute nodes, a periodic heartbeat communication to the transaction manager node, the periodic heartbeat communication comprising: an oldest local query identifier of queries that are active and a prior read-only query counter received from the transaction manager node, and an activity list comprising active identifiers of data-modifying transactions; storing locally, by the transaction manager node in a globally-unique table for the system, the system activity list and completed identifiers of data-modifying transactions that are completed; determining, by the transaction manager node, a query associated with one of the active identifiers having met an abort condition based at least on the periodic heartbeat communications; transmitting, by the transaction manager node, indicia of aborting the query to a lock manager service enabling the lock manager service to release locks associated with execution of the query; modifying, by the transaction manager node and subsequent to the locks being released, an active identifier associated with the query to an abort identifier associated with the query; and storing the abort identifier, by the transaction manager node, in a master abort cache at the transaction manager.

In an embodiment, the method further comprises: providing, by the transaction manager node to the control node and subsequent to receiving by the system a next query against a data set that has a plurality of versions for data thereof, a token associated with the next query, the token including a transaction start identifier of the next query, an active transaction list, and a partial abort list of recently aborted queries, in the master abort cache, comprising the abort identifier associated with the query; and storing respectively in local abort caches, by each of the control node and the plurality of compute nodes, the abort identifier associated with the query that is included in the token.

In an embodiment, the method further comprises: providing, by the transaction manager node to the control node and subsequent to receiving by the system a next query against a data set that has a plurality of versions for data thereof, a token associated with the next query, the token including a transaction start identifier of the next query, an active transaction list, and a partial abort list of recently aborted queries that includes the abort identifier associated with the query; identifying, by one or more of the plurality of compute nodes, a version of the plurality of versions of the data in the data set that excludes an aborted version of the data associated with the query based on the partial abort list in the token; and executing, distributively by the one or more of the plurality of compute nodes, respective portions of a task of the next query based on the data having the version.

In an embodiment of the method, the abort condition comprises at least one of: the transaction manager node or a lock manager service having been unavailable; an abort message being lost and a transaction of the query being completed; an instance of a database server under which the query executes, a process of the control node, or a process of one of the plurality of compute nodes being restarted; a compute pool comprising the control node and the plurality of compute nodes being paused; or a begin-transaction message being successfully provided by the transaction manager node and unsuccessfully received by the control node.

In an embodiment of the method, the periodic heartbeat communication also comprises a node-based list of active identifiers of data-modifying transactions; the abort condition comprises a mismatch between the node-based list of active identifiers of data-modifying transactions and the system activity list; and the method further comprises: aborting, by the transaction manager node, one or more transactions identified in the system activity list by active identifiers that lack a corresponding identifier in the node-based list.

In an embodiment of the method, the abort condition comprises a transaction start identifier of the query indicating an earlier time than the prior read-only query counter of the control node; and the method further comprises: providing, by the transaction manager node to the control node and subsequent to said storing locally the system activity list, a token associated with the query, the token including the transaction start identifier of the query; aborting the query by the control node based on the transaction start identifier of the query indicating an earlier time than the prior read-only query counter of the control node; and providing, by the control node to the transaction manager node, an abort indication for the query.

In an embodiment, the method further comprises: updating by the transaction manager node an oldest active transaction identifier of the computing system based at least on the query being aborted; and initiating by the transaction manager node a cleanup operation that includes truncating an entry associated with the abort identifier in the master abort cache based on the oldest active transaction identifier being more recent than the query associated with the abort identifier.

Another computer-readable storage medium is also provided herein. The computer-readable storage medium has program instructions recorded thereon that, when executed by a processing system, perform a method. The method is for snapshot isolation query transactions in distributed systems, according to embodiments. The method includes scheduling, by each of a plurality of compute nodes, respectively, and a control node, a periodic heartbeat communication to a transaction manager node, the periodic heartbeat communication comprising: an oldest query identifier of queries that are active and a prior read-only query counter received from the transaction manager, and an activity list comprising active identifiers of data-modifying transactions; storing locally, by the transaction manager node in a globally-unique table for the system, the system activity list and completed identifiers of data-modifying transactions that are completed; determining, by the transaction manager node, a query associated with one of the active identifiers having met an abort condition based at least on the periodic heartbeat communications; transmitting, by the transaction manager node, indicia of aborting the query to a lock manager service enabling the lock manager service to release locks associated with execution of the query; modifying, by the transaction manager node and subsequent to the locks being released, an active identifier associated with the query to an abort identifier associated with the query; and storing the abort identifier, by the transaction manager node, in a master abort cache at the transaction manager.

In an embodiment of the computer-readable storage medium, the method further comprises: providing, by the transaction manager node to the control node and subsequent to receiving by the system a next query against a data set that has a plurality of versions for data thereof, a token associated with the next query, the token including a transaction start identifier of the next query, an active transaction list, and a partial abort list of recently aborted queries, in the master abort cache, comprising the abort identifier associated with the query; and storing respectively in local abort caches, by each of the control node and the plurality of compute nodes, the abort identifier associated with the query that is included in the token.

In an embodiment of the computer-readable storage medium, the method further comprises: providing, by the transaction manager node to the control node and subsequent to receiving by the system a next query against a data set that has a plurality of versions for data thereof, a token associated with the next query, the token including a transaction start identifier of the next query, an active transaction list, and a partial abort list of recently aborted queries; identifying, by one or more of the plurality of compute nodes, a version of the plurality of versions of the data in the data set that excludes an aborted version of the data associated with the query based on the token that includes the abort identifier associated with the query; and executing, distributively by the one or more of the plurality of compute nodes, respective portions of a task of the next query based on the data having the version.

In an embodiment of the computer-readable storage medium, the abort condition comprises at least one of: the transaction manager node or a lock manager service having been unavailable; an abort message being lost and a transaction of the query being completed; an instance of a database server under which the query executes, a process of the control node, or a process of one of the plurality of compute nodes being restarted; a compute pool comprising the control node and the plurality of compute nodes being paused; or a begin-transaction message being successfully provided by the transaction manager node and unsuccessfully received by the control node.

In an embodiment of the computer-readable storage medium, the periodic heartbeat communication also comprises a node-based list of active identifiers of data-modifying transactions; the abort condition comprises a mismatch between the node-based list of active identifiers of data-modifying transactions and the system activity list; and the method further comprises: aborting, by the transaction manager node, one or more transactions identified in the system activity list by active identifiers that lack a corresponding identifier in the node-based list.

In an embodiment of the computer-readable storage medium, the abort condition comprises a transaction start identifier of the query indicating an earlier time than the prior read-only query counter of the control node; and the method further comprises: providing, by the transaction manager node to the control node and subsequent to said storing locally the system activity list, a token associated with the query, the token including the transaction start identifier of the query; aborting the query by the control node based on the transaction start identifier of the query indicating an earlier time than the prior read-only query counter of the control node; and providing, by the control node to the transaction manager node, an abort indication for the query.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
a processor;
a computer-readable storage medium comprising program instructions that, when executed by the processor, cause the processor to:
receive a periodic heartbeat communication comprising:
an oldest local query identifier of queries that are active, and
a system activity list comprising active identifiers of data-modifying transactions;
store, in a table, the system activity list and commit identifiers of data-modifying transactions that are successfully completed;
determine a global oldest active transaction identifier based at least on the periodic heartbeat communication; and
initiate a cleanup operation on items determined based on the commit identifiers that are older than the global oldest transaction identifier and older than a point-in-time retention interval.

2. The system of claim 1, wherein, to initiate the cleanup operation, the program instructions, when executed by the processor, cause the processor to:
provide the global oldest active transaction identifier to a garbage collector to perform the cleanup operation.

3. The system of claim 1, wherein the periodic heartbeat communication further comprises a prior read-only query counter, and, to determine the oldest active transaction identifier, the program instructions, when executed by the processor, cause the processor to:
determine the oldest prior read-only query counter among prior read-only query counters received in periodic heartbeat communications from a plurality of remote nodes.

4. The system of claim 1, wherein the program instructions, when executed by the processor, further cause the processor to:
recalculate the oldest active transaction identifier based on a subsequently-received periodic heartbeat communication.

5. The system of claim 1, wherein the program instructions, when executed by the processor, further cause the processor to:
receive, from a remote node, a forget message that is transmitted by the remote node upon startup or restart of the remote node; and
abort a query associated with the remote node.

6. The system of claim 1, wherein the periodic heartbeat communication further comprises node-based list of active identifiers of data-modifying transactions, and the program instructions, when executed by the processor, further cause the processor to:
abort a query identified in the system activity list by an active identifier that lacks a corresponding identifier in the node-based list.

7. The system of claim 1, wherein the program instructions, when executed by the processor, further cause the processor to:
provide, to a remote node, a periodic heartbeat communication response that includes a list of data-modifying transaction identifiers of transactions that are active on the remote node to cause the remote node to abort any transaction not included in the list of data-modifying transaction identifiers.

8. The system of claim 7, wherein the program instructions, when executed by the processor, further cause the processor to:
block, for the duration of time between the receipt of the periodic heartbeat communication and the transmission of the periodic heartbeat communication response, a transaction start message from the remote node.

9. A method performed by a transaction manager node, comprising:
receiving a periodic heartbeat communication comprising:
an oldest local query identifier of queries that are active and a prior read-only query counter, and
an activity list comprising active identifiers of data-modifying transactions;
storing, in a table, the system activity list and completed identifiers of data-modifying transactions that are completed;
determining that a query associated with one of the active identifiers has met an abort condition based at least on the periodic heartbeat communication;
transmitting, to a lock manager service, an indicia of aborting the query to enable the lock manager service to release locks associated with the query;
modifying, subsequent to the release of the locks, an active identifier associated with the query to an abort identifier associated with the query; and
storing the abort identifier in a master abort cache.

10. The method of claim 9, further comprising:
receiving a next query; and
providing, to a remote node, a token associated with the next query, the token including a transaction start identifier of the next query, an active query list, and a partial abort list of recently aborted queries, the partial abort list including the abort identifier.

11. The method of claim 9, wherein the abort condition comprises at least one of:
the transaction manager node or the lock manager service having been unavailable;
an abort message being lost and a transaction of the query being completed;
an instance of a database server under which the query executes, a process of a control node, or a process of one of a plurality of compute nodes being restarted;
a compute pool comprising the control node and the plurality of compute nodes being paused; or
a begin-transaction message being successfully provided by the transaction manager node and unsuccessfully received by the control node.

12. The method of claim 9, wherein the periodic heartbeat communication further comprises a node-based list of active identifiers of data-modifying transactions; and the abort condition comprises a mismatch between the node-based list of active identifiers of data-modifying transactions and the system activity list.

13. The method of claim 9, further comprising:
determining an oldest active transaction identifier responsive to aborting the query; and initiating a clean up operation to truncate, in the master abort cache, an entry associated with the abort identifier of the query, wherein the query is older than the oldest active transaction identifier.

14. The method of claim 9, wherein the abort condition comprises a transaction start identifier of the query indicating an earlier time than a prior read-only query counter received in a periodic heartbeat communication from a control node; and the method further comprising:
   providing, to the control node, a token associated with the query that includes the transaction start identifier of the query, wherein the token causes the control node to abort the query; and
   receiving, from the control node, an abort indication for the query.

15. A computer-readable storage medium comprising program instructions that, when executed by a processor of a transaction manager node, cause the processor to:
   receive a periodic heartbeat communication comprising:
      an oldest local query identifier of queries that are active and a prior read-only query counter, and
      an activity list comprising active identifiers of data-modifying transactions;
   store, in a table, the system activity list and completed identifiers of data-modifying transactions that are completed;
   determine that a query associated with one of the active identifiers has met an abort condition based at least on the periodic heartbeat communication;
   transmit, to a lock manager service, an indicia of aborting the query to enable the lock manager service to release locks associated with the query;
   modify, subsequent to the release of the locks, an active identifier associated with the query to an abort identifier associated with the query; and
   store the abort identifier in a master abort cache.

16. The computer-readable storage medium of claim 15, wherein the program instructions, when executed by the processor, further cause the processor to:
   receive a next query; and
   provide, to a remote node, a token associated with the next query, the token including a transaction start identifier of the next query, an active query list, and a partial abort list of recently aborted queries, the partial abort list including the abort identifier.

17. The computer-readable storage medium of claim 15, wherein the abort condition comprises at least one of:
   the transaction manager node or the lock manager service having been unavailable;
   an abort message being lost and a transaction of the query being completed;
   an instance of a database server under which the query executes, a process of a control node, or a process of one of a plurality of compute nodes being restarted;
   a compute pool comprising the control node and the plurality of compute nodes being paused; or
   a begin-transaction message being successfully provided by the transaction manager node and unsuccessfully received by the control node.

18. The computer-readable storage medium of claim 15, wherein the periodic heartbeat communication further comprises a node-based list of active identifiers of data-modifying transactions; and the abort condition comprises a mismatch between the node-based list of active identifiers of data-modifying transactions and the system activity list.

19. The computer-readable storage medium of claim 15, wherein the program instructions, when executed by the processor, further cause the processor to:
   determine an oldest active transaction identifier responsive to aborting the query; and
   initiate a clean up operation to truncate, in the master abort cache, an entry associated with the abort identifier of the query, wherein the query is older than the oldest active transaction identifier.

20. The computer-readable storage medium of claim 15, wherein the abort condition comprises a transaction start identifier of the query indicating an earlier time than a prior read-only query counter received in a periodic heartbeat communication from a control node; and the program instructions, when executed by the processor, further cause the processor to:
   provide, to the control node, a token associated with the query that includes the transaction start identifier of the query, wherein the token causes the control node to abort the query; and
   receive, from the control node, an abort indication for the query.

* * * * *